(12) United States Patent
Bacchi et al.

(10) Patent No.: US 6,360,144 B1
(45) Date of Patent: *Mar. 19, 2002

(54) SELF-TEACHING ROBOT ARM POSITION METHOD

(75) Inventors: Paul Bacchi, Novato; Paul S. Filipski, Greenbrae, both of CA (US)

(73) Assignee: Newport Corporation, Irvine, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/224,134

(22) Filed: Dec. 31, 1998

Related U.S. Application Data

(60) Continuation-in-part of application No. 09/098,389, filed on Jun. 16, 1998, now abandoned, which is a division of application No. 08/500,489, filed on Jul. 10, 1995, now Pat. No. 5,765,444.

(51) Int. Cl.[7] .......................... G05B 19/04; G05B 19/18
(52) U.S. Cl. .................. 700/250; 700/245; 700/249; 700/258; 700/259; 700/260; 700/261; 700/262; 700/264; 414/744.3; 414/744.5; 414/744.6; 74/490.03
(58) Field of Search .............................. 700/245, 250, 700/258, 260, 55, 61, 900, 261, 248, 262, 264, 259, 249; 414/941, 416, 417, 816, 744.3, 744.5, 744.6; 74/490.03; 294/88

(56) References Cited

U.S. PATENT DOCUMENTS

| | | | | |
|---|---|---|---|---|
| 5,741,113 A | * | 4/1998 | Bacchi et al. | 414/744.5 |
| 5,765,444 A | * | 6/1998 | Bacchi et al. | 74/490.03 |
| 5,944,476 A | * | 8/1999 | Bacchi et al. | 414/783 |
| 5,980,188 A | * | 11/1999 | Ko et al. | 414/417 |
| 6,098,484 A | * | 8/2000 | Bacchi et al. | 74/490.03 |
| 6,105,454 A | * | 8/2000 | Bacchi et al. | 74/490.03 |

FOREIGN PATENT DOCUMENTS

JP 05142232 * 6/1993

OTHER PUBLICATIONS

Zomaya et al., Direct neuro–adaptive control of robot manipulators, 1992, IEEE, pp. 1902–1907.*
Ahmad, A laboratory experiment to teach some concepts on sensor–based robot assembly system, 1988, IEEE, pp. 74–84.*
Song et al., Intelligent Rehabilitation Robotic System For The Disabled And The Elderly, IEEE., pp. 2682–2685, 1998.*
Hesselroth et al., Neural Network Control Of A Pneumatic Robot Arm, IEEE., pp. 28–38, 1994.*
Ganesh et al., Ultrasonic Sensor–Based Motion Control for Robotic Manipulators, IEEE., pp.796–797, 1989.*

* cited by examiner

*Primary Examiner*—William A. Cuchlinski, Jr.
*Assistant Examiner*—Marc McDieunel
(74) *Attorney, Agent, or Firm*—Stoel Rives LLP

(57) ABSTRACT

A self-teaching robot arm positioning method that compensates for support structure component alignment offset entails the use of a component emulating fixture preferably having mounting features that are matable to support structure mounting elements. Robot arm mechanism motor angular position data measured relative to component emulating fixture features are substituted into stored mathematical expressions representing robot arm vector motion to provide robot arm position output information. This information indicates whether the actual relative alignment between the robot arm mechanism and a semiconductor wafer carrier is offset from a nominal relative alignment. For manual correction, robot arm mechanism position output information provides the angular offset between the actual and nominal radial distances between the robot arm mechanism shoulder axis and two locating features of the component emulating fixture. Position coordinates for proper alignment by manual repositioning of any misaligned wafer carrier can then be derived. For automatic correction, robot arm mechanism position output information is used to derive a vector trajectory that causes the end effector of the robot arm mechanism to properly access the wafer stored in a misaligned wafer carrier.

13 Claims, 21 Drawing Sheets

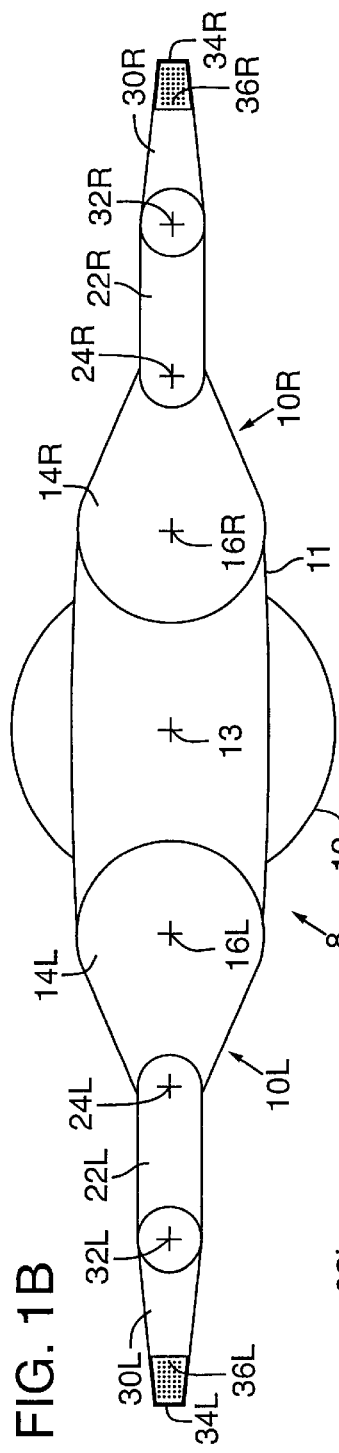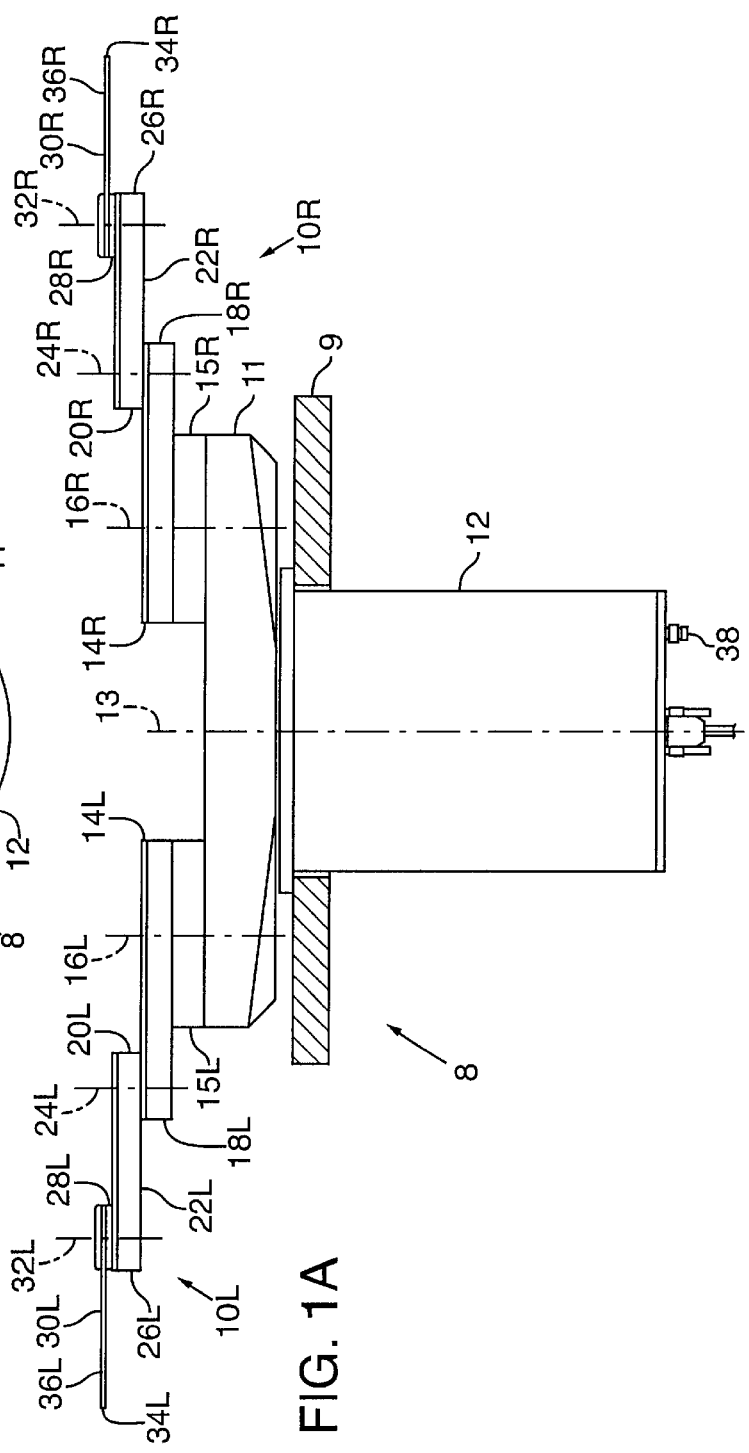
FIG. 1B
FIG. 1A

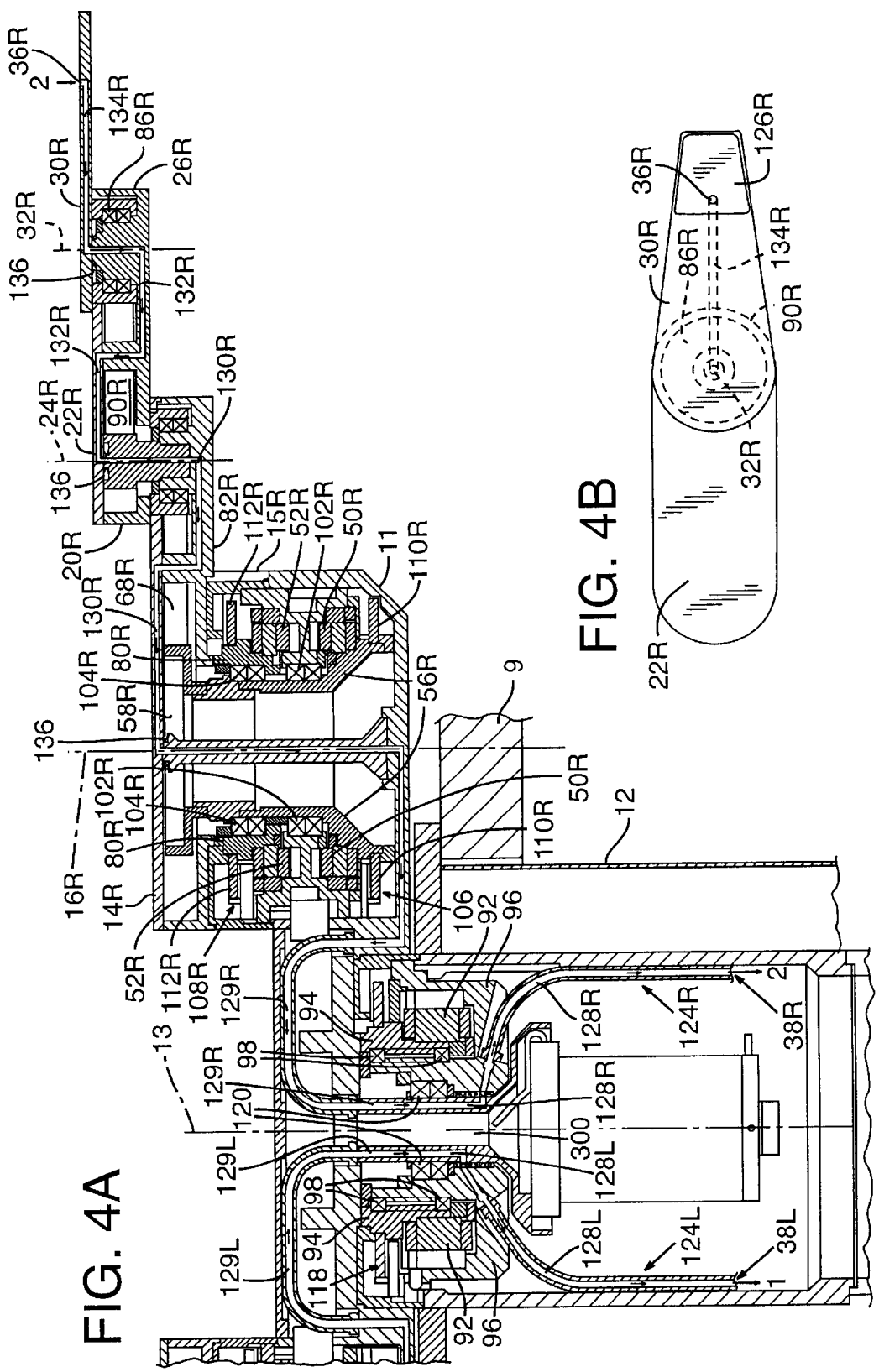

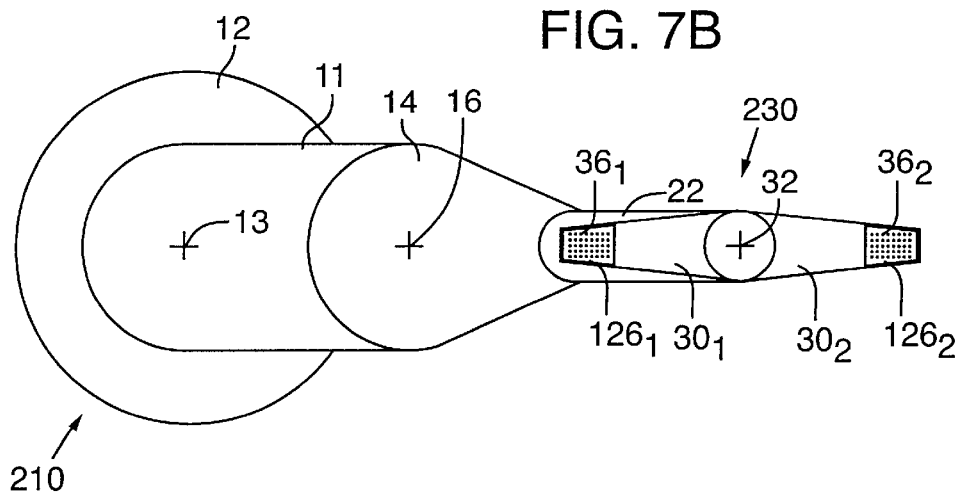
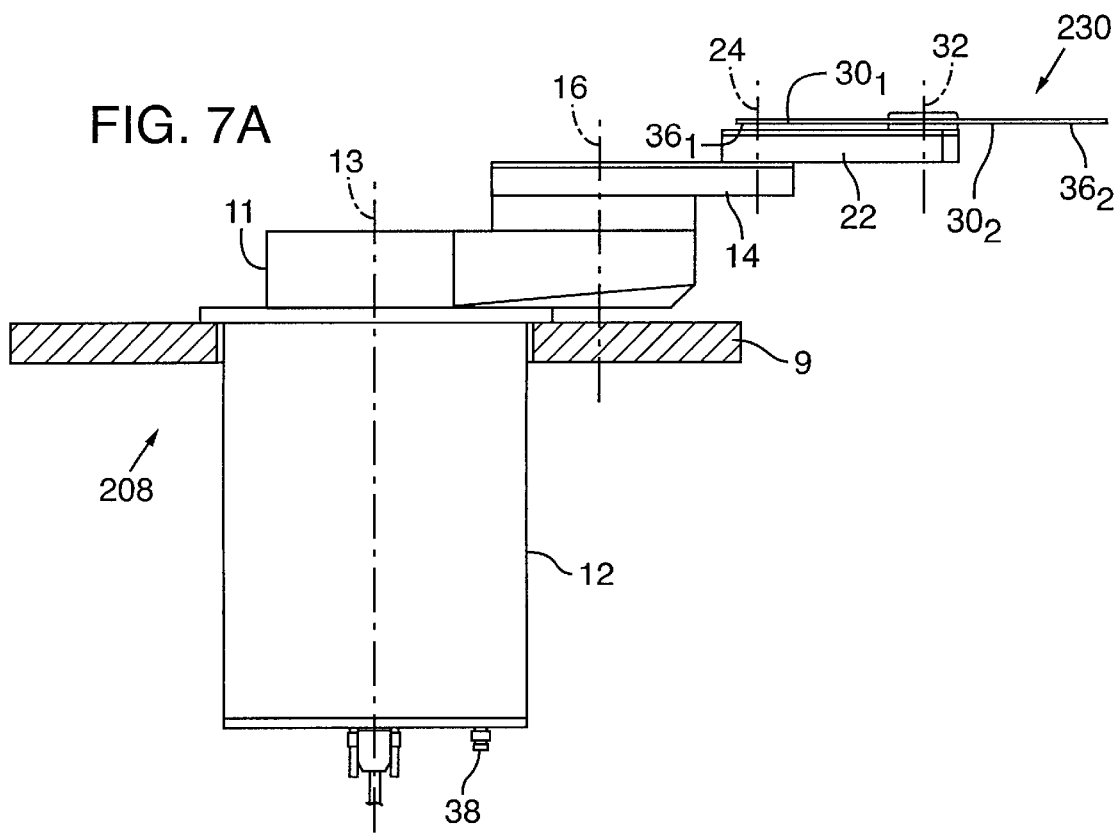

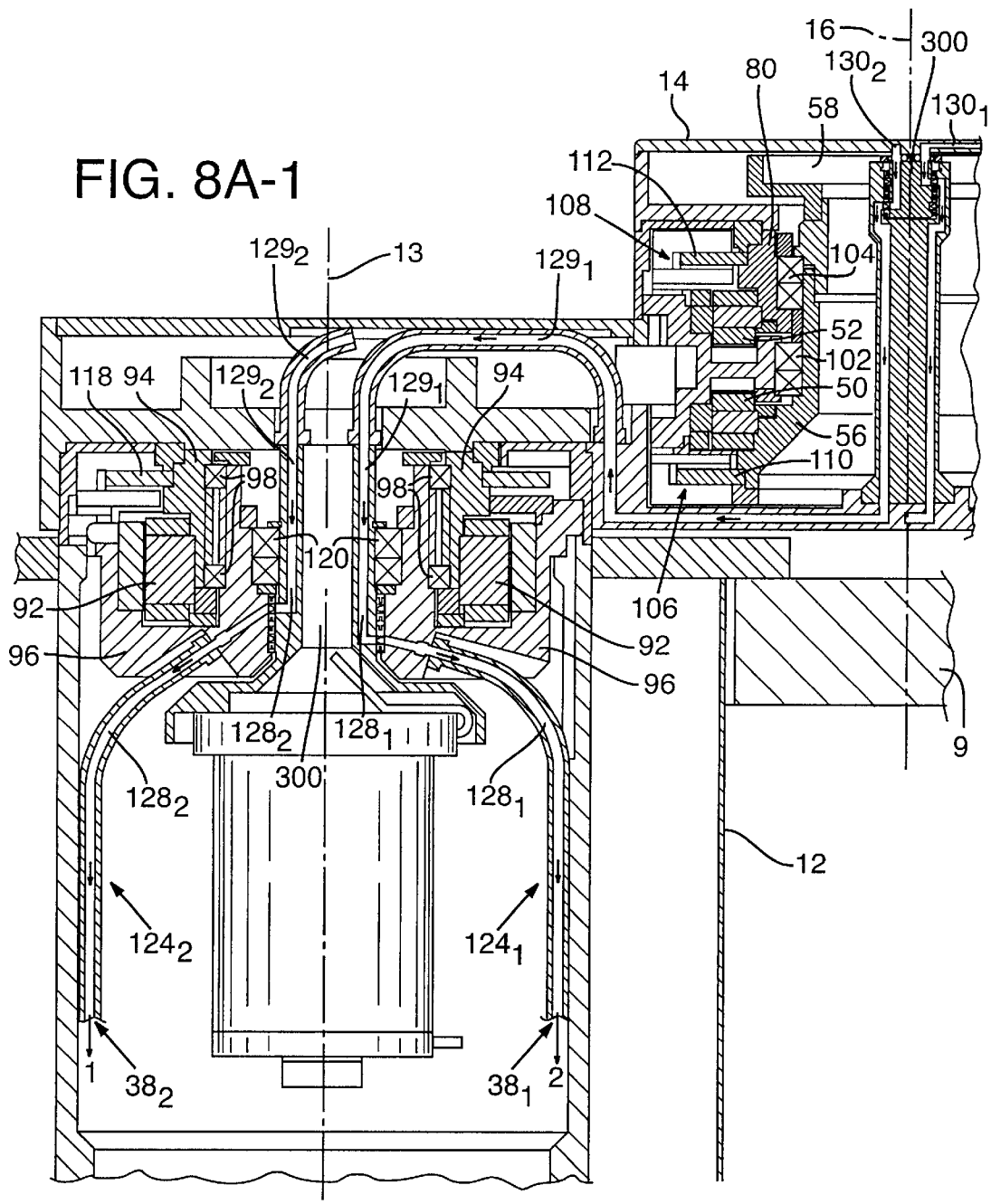

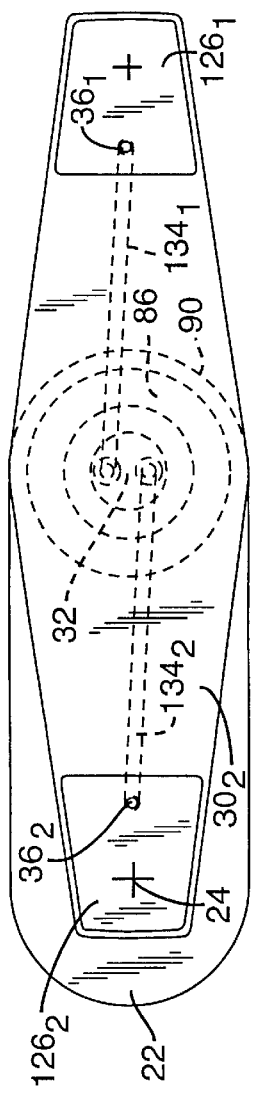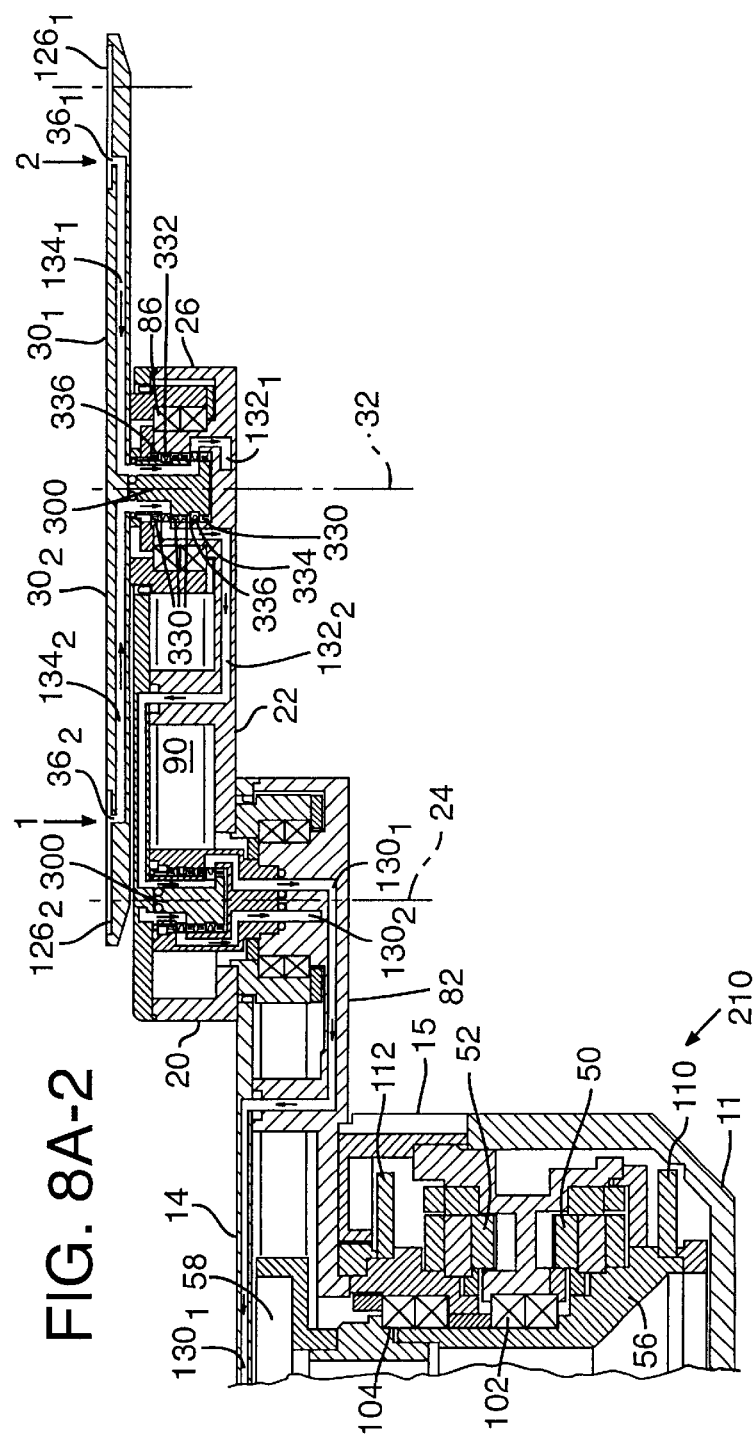

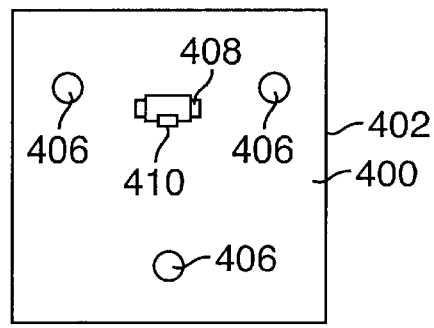
FIG. 12
FIG. 13A
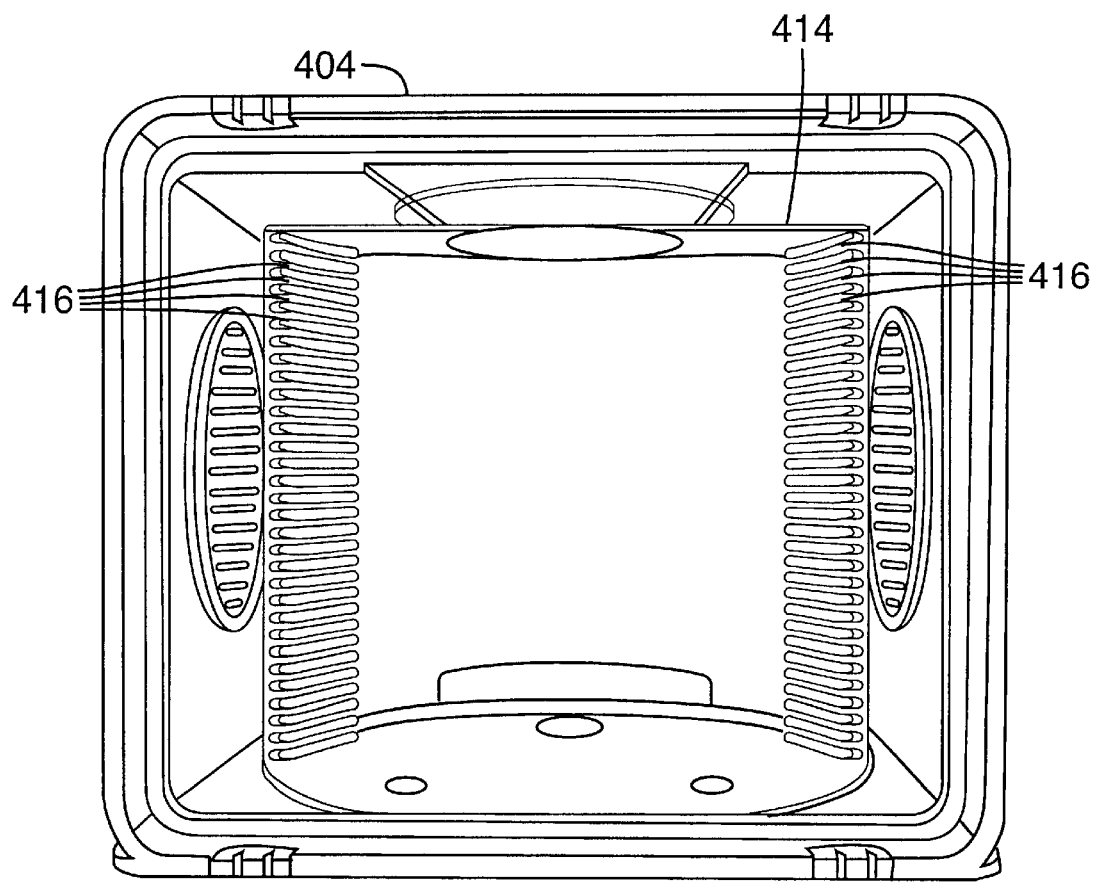

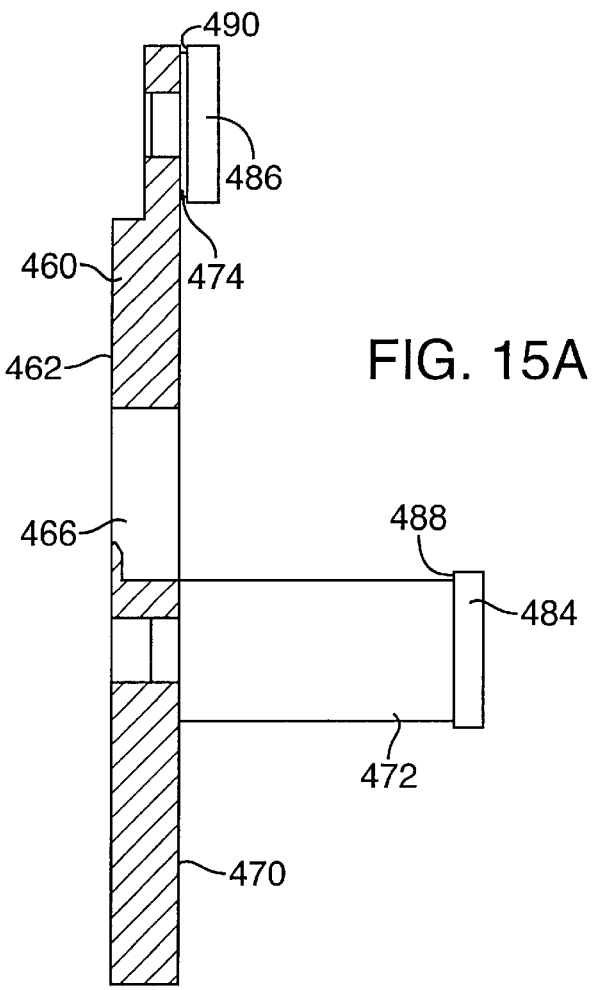
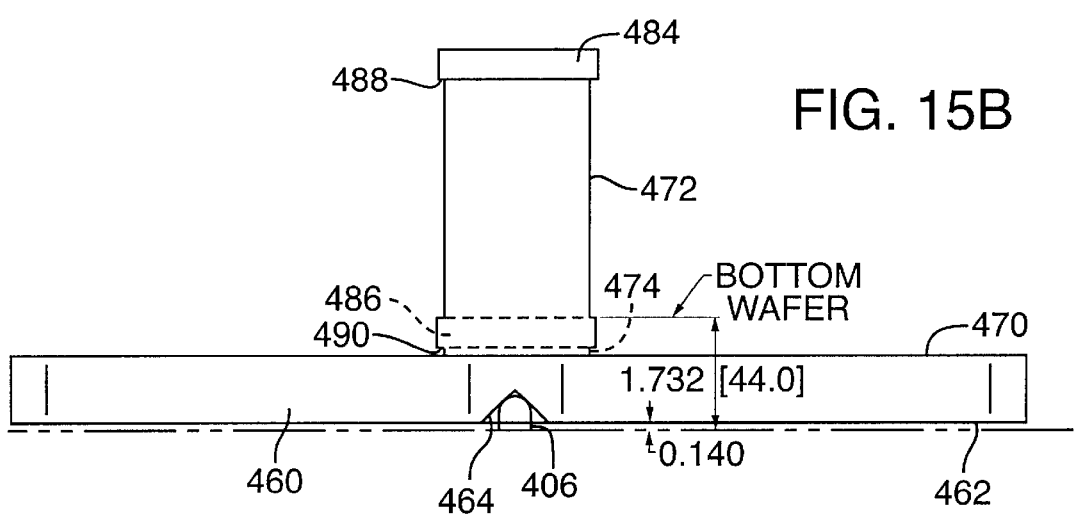

SELF-TEACHING ROBOT ARM POSITION METHOD

RELATED APPLICATIONS

This application is a continuation in part of U.S. patent application Ser. No. 09/098,389, filed Jun. 16, 1998 now abandoned, which is a division of U.S. patent application Ser. No. 08/500,489, filed Jul. 10, 1995, now U.S. Pat. No. 5,765,444.

TECHNICAL FIELD

The present invention relates to robot arm mechanisms and, in particular, to a self-teaching robot arm positioning method that determines whether there exists misalignment of a specimen holder relative to a robot arm mechanism to prevent the robot arm from reaching toward an unintended location on the specimen holder.

BACKGROUND OF THE INVENTION

Currently available robot arm mechanisms include pivotally joined multiple links that are driven by a first motor and are mechanically coupled to effect straight line movement of an end effector or hand and are equipped with a second, independently operating motor to angularly displace the hand about a central axis. Certain robot arm mechanisms are equipped with telescoping mechanisms that move the hand also in a direction perpendicular to the plane of straight line movement and angular displacement of the hand. The hand is provided with a vacuum outlet that secures a specimen, such as a semiconductor wafer, computer hard disk, or compact disk, to the hand as it transports the specimen between processing stations.

U.S. Pat. No. 4,897,015 of Abbe et al. describes a rotary-to-linear motion robot arm that uses a first motor to control a multi-linkage robot arm to produce straight line radial motion from motor-driven rotary motion. An additional motor may be coupled to the robot arm for operation independent of that of the first motor to angularly move the multi-linkage robot arm without radial motion. Because they independently produce radial motion and angular motion, the first and second motors produce useful robot arm movement when either one of them is operating.

The robot arm of the Abbe et al. patent extends and retracts an end effector (or a hand) along a straight line path by means of a mechanism that pivotally couples in a fixed relationship a first arm (or forearm) and a second (or upper) arm so that they move in predetermined directions in response to rotation of the upper arm. To achieve angular displacement of the hand, a θ drive motor rotates the entire robot arm structure. The Abbe et al. patent describes no capability of the robot arm to reach around corners or travel along any path other than a straight line or a circular segment defined by a fixed radius.

U.S. Pat. No. 5,007,784 of Genov et al. describes a robot arm with an end effector structure that has two oppositely extending-hands, each of which is capable of picking up and transporting a specimen. The end effector structure has a central portion that is centrally pivotally mounted about the distal end of a second link or forearm. The extent of pivotal movement about all pivot axes is purposefully limited to prevent damage to vacuum pressure flexible conduits resulting from kinking or twisting caused by over-rotation in a single direction.

The coupling mechanism of a first link or upper arm, the forearm, and the end effector structure of the robot arm of the Genov et al. patent is more complex than that of the robot arm of the Abbe et al. patent. Nevertheless, the robot arm structures of the Abbe et al. and Genov et al. patents operate similarly in that each of the end effector structures picks up and transports specimens by using one motor to extend and retract a hand and another, different motor to rotate the entire robot arm structure to allow the hand to extend and retract at different ones of a restricted number of angular positions.

Robot arms of the type described by the Abbe et al. and Genov et al. patents secure a specimen to the hand by-means of vacuum pressure delivered to the hand through fluid conduits extending through the upper arm, forearm, and hand and around all of the pivot axes. The Abbe et al. patent is silent about a vacuum pressure delivery system, and the Genov et al. patent describes the use of flexible fluid conduits. The presence of flexible fluid conduits limits robot arm travel path planning because unidirectional robot arm link rotation about the pivot axes "winds up" the conduits and eventually causes them to break. Thus, conduit breakage prevention requirements prohibit-continuous robot arm rotation about any of the pivot axes and necessitate rewind maneuvers and travel path "lockout" spaces as part of robot arm travel path planning. The consequences of such rewind maneuvers are more complex and limited travel path planning, reduced throughput resulting from rewind time, and reduced available work space because of the lockout spaces.

Moreover, subject to lockout space constraints, commercial embodiments of such robot arms have delivered specimens to and retrieve specimens from stations angularly positioned about paths defined only by radial distances from the axes of rotation of the robot arms.

Thus, the robot arm structures described by the Abbe et al. and Genov et al. patents are incapable of transporting specimens between processing stations positioned in compact, irregularly shaped working spaces. For example, neither of these robot arm structures is set up to remove specimen wafers from and place specimen wafers in wafer cassettes having their openings positioned side-by-side in a straight line arrangement of a tightly packed working space.

Wafer cassettes are usually positioned side by side on a support structure along a radial path measured from the central axis of or along a straight line distance from the robot arm mechanism. These wafer cassettes are often misaligned from their nominal cassette opening arrangements relative to the robot arm mechanism. Such misalignment could cause a robot arm mechanism to direct the hand or the wafer it carries to strike the cassette instead of extend into its opening to, respectively, remove or replace a wafer. Robot arm mechanism contact with the cassette resulting from alignment offset can, therefore, create contaminant particles.

SUMMARY OF THE INVENTION

An object of the invention is, therefore, to provide a multiple link robot arm system that has straight line motion, extended reach, corner reacharound, and continuous bidirectional rotation capabilities for transporting specimens to virtually any location in an available work space that is free of lockout spaces.

Another object of the invention is to provide such a system that increases specimen processing throughput in the absence of robot arm rewind time and radial positioning of processing station requirements.

A further object of this invention is to provide such a system that is capable of continuous rotation in either direction with no susceptibility to kinking, twisting, or breaking of conduits delivering vacuum pressure to the hand.

Still another object of the invention is to provide such a system that uses two motors capable of synchronous operation and a linkage coupling mechanism that permit a hand of an end effector structure to change its extension as the multiple link robot arm mechanism to which the hand is associated changes its angular position.

Yet another object of the invention is to provide a system component misalignment correction technique for either mechanical alignment of system it components or robot arm mechanism trajectory control to compensate for support structure alignment offset.

Each of two preferred embodiments of the present invention includes two end effectors or hands. A first embodiment comprises two multiple link robot arm mechanisms mounted on a torso link that is capable of 360 degree rotation about a central or "torso" axis. Each robot arm mechanism includes an end effector having a single hand. A second embodiment is a modification of the first embodiment in that the former has one of the robot arm mechanisms removed from the torso link and substitutes on the remaining robot arm mechanism an end effector with oppositely extending hands for the end effector having a single hand.

Each of the multiple link robot arm mechanisms of the first and second embodiments uses two motors capable of synchronized operation to permit movement of the robot arm hand along a curvilinear path as the extension of the hand changes. A first motor rotates a forearm about an elbow axis that extends through distal and proximal ends of the upper arm and forearm, respectively, and a second motor rotates an upper arm about a shoulder axis that extends through a proximal end of the upper arm. A mechanical linkage couples the upper arm and the forearm. The mechanical linkage forms an active drive link and a passive drive link. The active drive link operatively connects the first motor and the forearm to cause the forearm to rotate about the elbow axis in response to the first motor. The passive drive link operatively connects the forearm and the hand to cause the hand to rotate about a wrist axis in response to rotation of the forearm about the elbow axis. The wrist axis extends through distal and proximal ends of the forearm and hand, respectively.

In two embodiments described in detail below, a motor controller controls the first and second motors in two preferred operational states to enable the robot arm mechanism to perform two principal motion sequences. The first operational state maintains the position of the first motor and rotates the second motor so that the mechanical linkage causes linear displacement (i.e., extension or retraction) of the hand. The second operational state rotates the first and second motors so that the mechanical linkage causes angular displacement of the hand about the shoulder axis. The second operational state can provide an indefinite number of travel paths for the hand, depending on coordination of the control of the first and second motors.

Whenever the first and second motors move equal angular distances, the angular displacement of the upper arm about the shoulder axis and the angular displacement of the forearm about the elbow axis equally offset and thereby result in only a net angular displacement of the hand about the shoulder axis. Thus, under these conditions, there is no linear displacement of the hand and no rotation of the hand about the wrist axis. Whenever the first and second motors move different angular distances, the angular displacement of the upper arm about the shoulder axis and the angular displacement of the forearm about the elbow axis only partly offset and thereby result in angular displacements of the hand about the shoulder and wrist axes and consequently a linear is displacement of the hand. Coordination of the position control of the first and second motors enables the robot arm mechanism to describe a compound curvilinear path of travel for the hand.

A third or torso motor rotates the torso link about the central axis, which extends through the center of the torso link and is equidistant from the shoulder axes of the robot arm mechanisms of the first embodiment. The motor controller controls the operation of the torso motor to permit rotation of the torso link independent of the motion of the robot arm mechanism or mechanisms mounted to it. The presence of the rotatable torso link together with the independent robot arm motion permits simple, nonradial positioning of specimen processing stations relative to the torso axis, extended paddle reach, and corner reacharound capabilities. The consequence is a high speed, high throughput robot arm system that operates in a compact work space.

Each of the robot arm mechanisms of the first embodiment is equipped with a rotary fluid slip ring acting as a fluid feedthrough conduit. These slip rings permit the hand to rotate continuously in a single direction as the robot arm links rotate continuously about the shoulder, elbow, and wrist axes without a need to unwind to prevent kinking or twisting of fluid pressure lines. Vacuum pressure is typically delivered through the fluid pressure lines.

The robot arm mechanism of the second embodiment is equipped with a rotary fluid multiple-passageway spool that delivers fluid pressure separately to each rotary joint of and permits continuous rotation of the robot arm links in a single direction about the central, shoulder, elbow, and wrist axes.

Preferred embodiments implementing the self-teaching robot arm positioning method to compensate for support structure alignment offset need not include two end effectors or hands. A misalignment correction technique carried out in accordance with the invention entails the use of a component emulating fixture preferably having mounting features that are matable to support structure mounting elements. The emulating fixture preferably includes two upwardly extending, cylindrical locating features that are positioned to engage a fork-shaped end effector in two different extension positions. The robot arm positioning method is self teaching in that the motor angular position data measured relative to the fixture features are substituted into stored mathematical expressions representing robot arm mechanism motion to provide robot arm position output information that determines the alignment position of the wafer carrier and thereby the existence of error in its actual alignment relative to a nominal alignment.

For manual correction, robot arm mechanism position output information provides the angular offset between the actual and nominal radial distances between the robot arm mechanism shoulder axis and the two locating features. Position coordinates for proper alignment by manual repositioning of any misaligned wafer carrier can then be derived. For automatic correction, robot arm mechanism position output information is used to derive a trajectory that causes the end effector to properly access the wafers stored in a misaligned wafer carrier.

Additional objects and advantages of this invention will be apparent from the following detailed description of preferred embodiments thereof which proceeds with reference to the accompanying drawings.

BRIEF DESCRIPTION OF THE DRAWINGS

FIGS. 1A, 1B, and 1C are respective side elevation, plan, and cross-sectional views of a two-arm, multiple link robot arm system of the present invention.

FIGS. 4A and 4B are respective cross-sectional and fragmentary plan views showing the interior components, mechanical linkage, and fluid pressure line paths of the robot arm system of FIGS. 1A, 1B, and 1C.

FIGS. 7A and 7B are respective side elevation and plan views of an alternative one-arm, multiple link robot arm system having an end effector structure with two oppositely extending hands.

FIGS. 8A-1 and 8A-2 and FIG. 8B are respective fragmentary cross-sectional and plan views showing the interior components, mechanical linkage, and fluid pressure line paths of the robot arm system of FIGS. 7A and 7B.

FIG. 12 shows an upper surface of a support structure adapted to receive a front-opening wafer carrier for 300 mm diameter semiconductor wafers.

FIG. 13A shows a wafer carrier with its carrier or box door removed to reveal the interior of the wafer carrier.

FIGS. 15A and 15B are respective diagrammatic cross-sectional and rear end elevation views of the component emulating fixture of FIGS. 14A and 14B.

DETAILED DESCRIPTION OF PREFERRED EMBODIMENTS

Figure 1C:
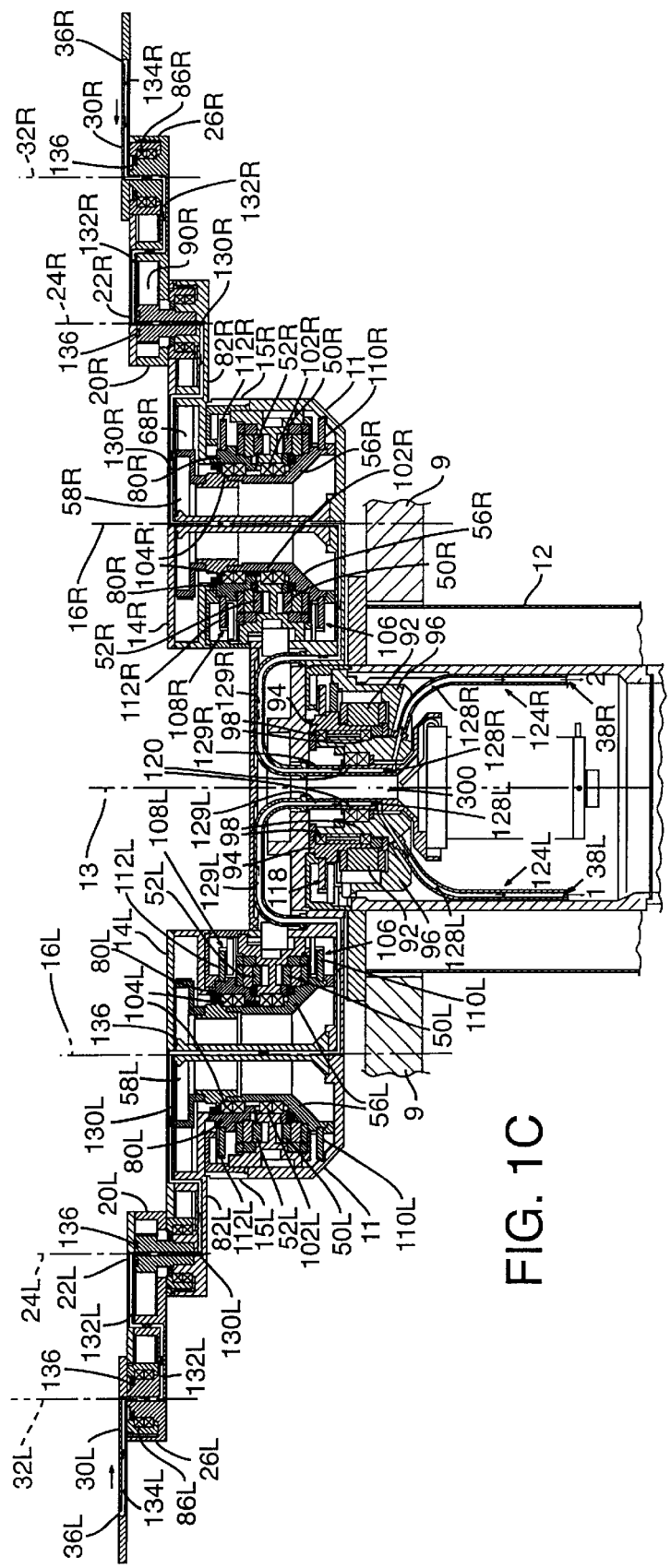

FIGS. 1A, 1B, and 1C are respective side elevation, plan, and cross-sectional views of a two-arm, multiple link robot arm system 8 mounted on and through an aperture in the top surface of a support table 9.

With reference to FIGS. 1A and 1B, two similar but independently controllable three-link robot arm mechanisms 10L and 10R are rotatably mounted at opposite ends of a torso link 11, which is mounted to the top surface of a base housing 12 for rotation about a central or torso axis 13. Because they are mirror images of each other, robot arm mechanisms 10L and 10R have corresponding components identified by identical reference numerals followed by the respective suffices "L" and "R". Accordingly, the following discussion is directed to the construction and operation of only robot arm mechanism 10R but is similarly applicable to robot arm mechanism 10L.

Robot arm mechanism 10R comprises an upper arm 14R mounted to the top surface of a cylindrical spacer 15R, which is positioned on the right-hand end of torso link 11 for rotation about a shoulder axis 16R. Cylindrical spacer 15R provides room for the motors and certain other components of robot arm mechanism 10R, as will be described below. Upper arm 14R has a distal end 18R to which a proximal end 20R of a forearm 22R is mounted for rotation about an elbow axis 24R, and forearm 22R has a distal end 26R to which a proximal end 28R of a hand 30R is mounted for rotation about a wrist axis 32R. Hand 30R is equipped at its distal end 34R with a fluid pressure outlet 36R that preferably applies vacuum pressure supplied to robot arm mechanism 10R at an inlet 38 to securely hold a semiconductor wafer, compact disk, or other suitable specimen (not shown) in place on hand 30R. As will be described in detail later, each of upper arm 14R, forearm 22R, and hand 30R is capable of continuous rotation about its respective shoulder axis 16R, elbow axis 24R, and wrist axis 32R.

Figure 2:
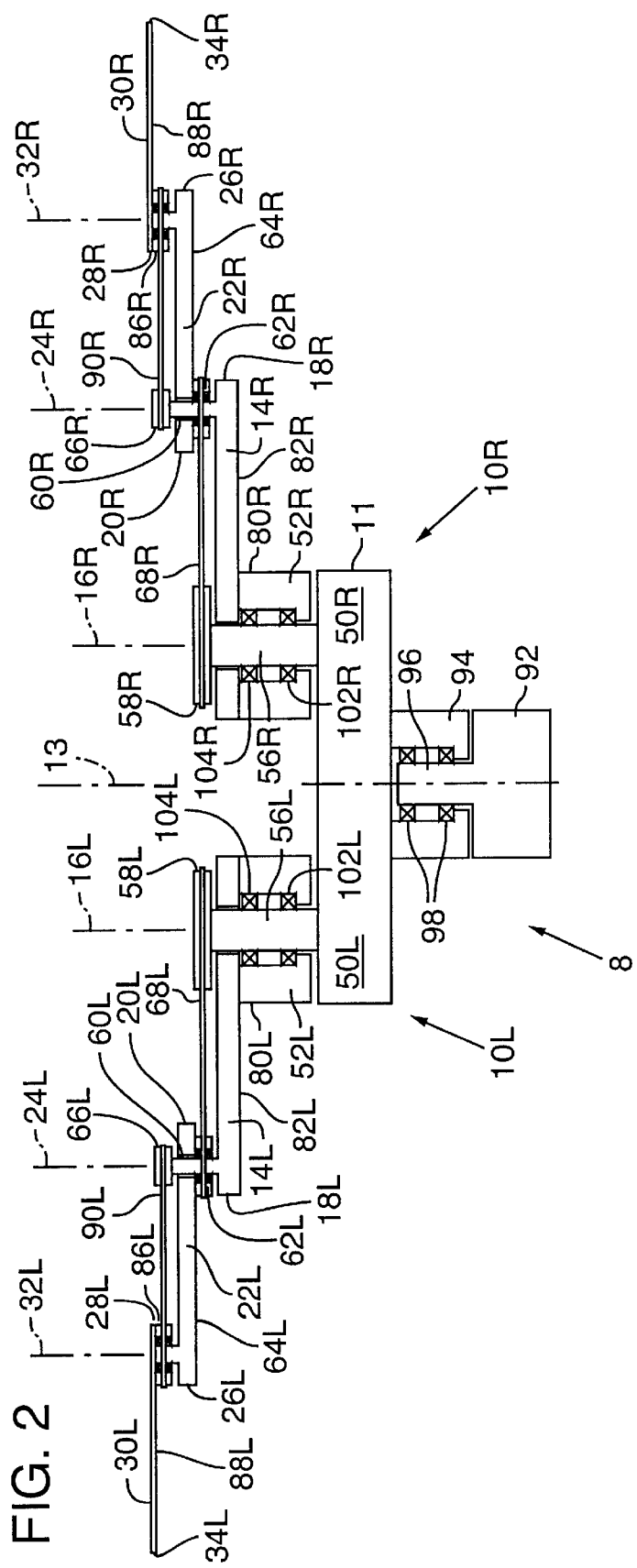
FIG. 2 is a side elevation view in stick diagram form showing the link components and the associated mechanical linkage of the robot arm system of FIGS. 1A, 1B, and 1C.
Figure 6A:
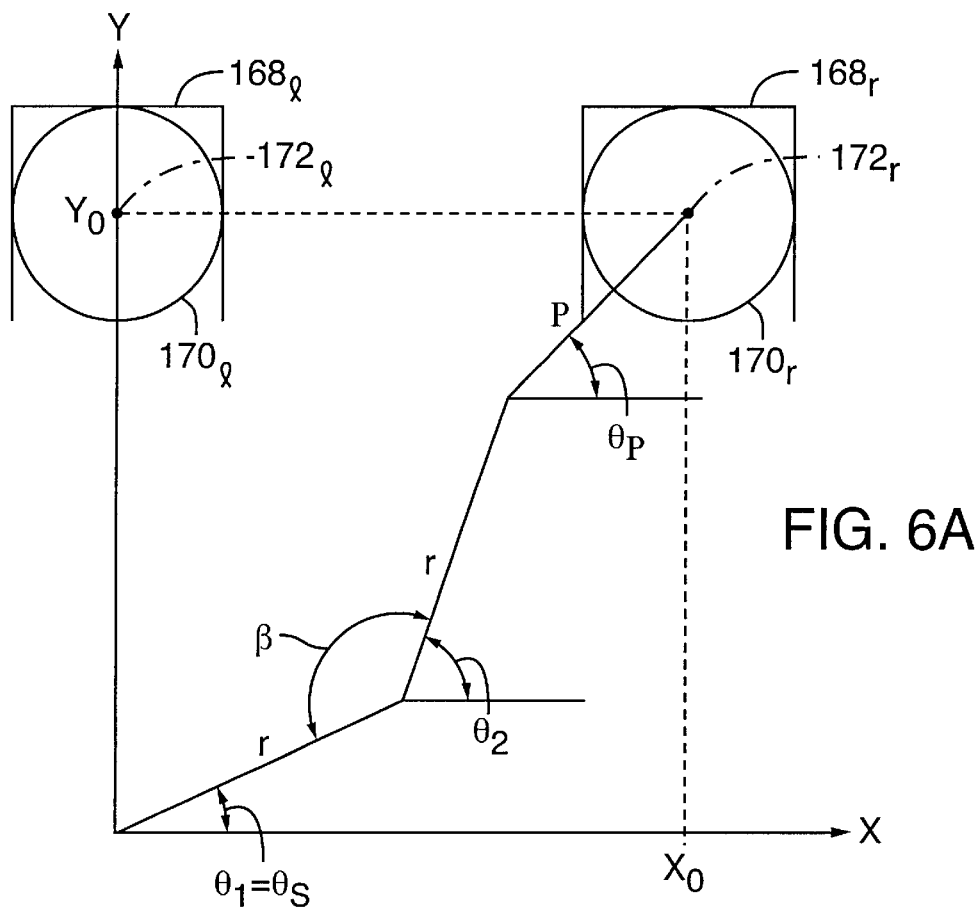
FIG. 6A is a diagram showing the spatial relationships and parameters that are used to derive control signals provided by, and FIG. 6B is a block diagram of, the motor controller for the embodiments of the dual end effector, multiple link robot arm system of the invention.
Figure 6B:
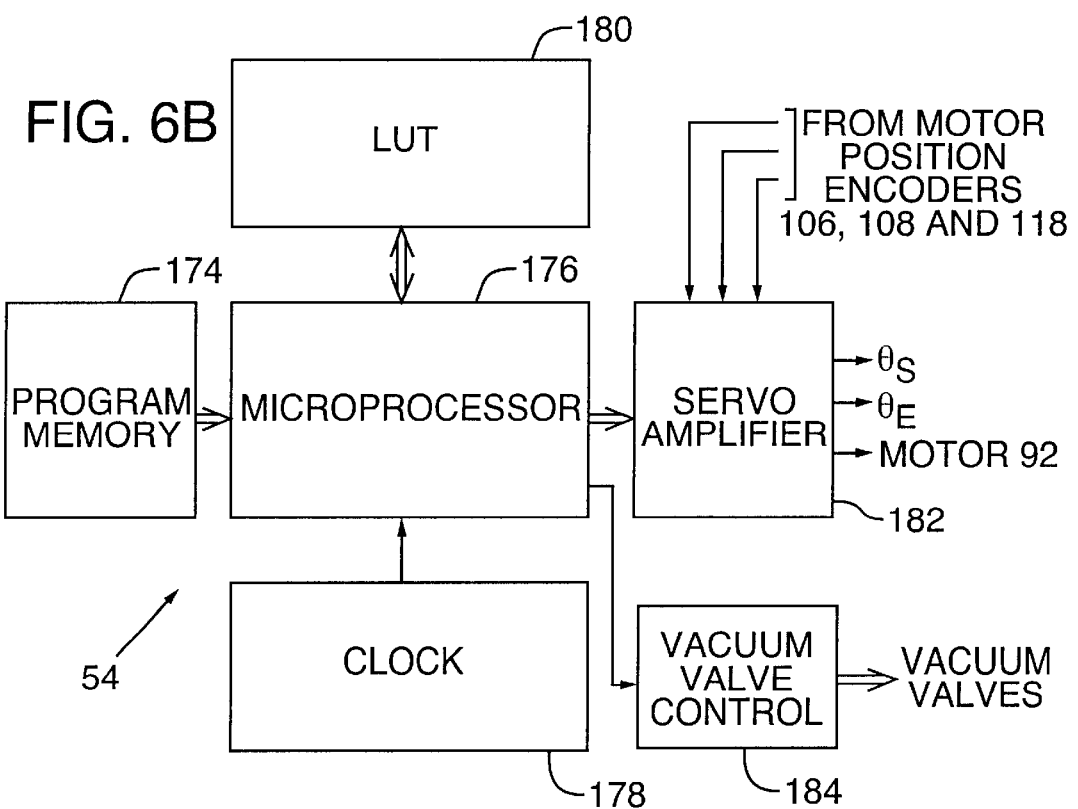

FIG. 2 shows the link components and associated mechanical linkage of robot arm mechanism 10R. With reference to FIG. 2, robot arm mechanism 10R is positioned by first and second concentric motors 50R and 52R that operate in response to commands provided by a motor controller 54 (FIGS. 6A and 6B). First motor 50R rotates forearm 22R about elbow axis 24R, and second motor 52R rotates upper arm 14R about shoulder axis 16R.

More specifically, first motor 50R rotates a forearm spindle 56R that extends through an aperture in upper arm 14R and terminates in an upper arm pulley 58R. A post 60R extends upwardly at distal end 18R of upper arm 14R through the center of a bearing 62R that is mounted to a bottom surface 64R of forearm 22R at its proximal end 20R. Post 60R also extends through an aperture in forearm 22R and terminates in a forearm pulley 66R. An endless belt 68R connects upper arm pulley 58R and the outer surface of bearing 62R to rotate forearm 22R about elbow axis 24R in response to rotation of first motor 50R.

Second motor 52R rotates an upper arm spindle 80R that is mounted to a bottom surface 82R of upper arm 14R to rotate upper arm 14R about shoulder axis 16R. Coordinated operation of first and second motors 50R and 52R in conjunction with the mechanical linkage described below causes hand 3OR to rotate about shoulder axis 16R. A post 84R extends upwardly through the center of a bearing 86R that is mounted to a bottom surface 88R of hand 30R. An endless belt 90R connects forearm pulley 66R to the outer surface of bearing 86R to rotate hand 30R about shoulder axis 16R in response to the coordinated rotational motions of motors 50R and 52R.

The mechanical linkage coupling upper arm 14R and forearm 22R forms an active drive link and a passive drive link. The active drive link includes belt 68R connecting upper arm pulley 58R and the outer surface of bearing 62R and causes forearm 22R to rotate in response to rotation of first motor 50R. The passive drive link includes belt 90R connecting forearm pulley 66R and the outer surface of bearing 86R and causes hand 30R to rotate about wrist axis 32R in response to rotation of forearm 22R about elbow axis 24R. Rotation of hand 30R can also be caused by a complex interaction among the active and passive drive links and the rotation of upper arm 14R in response to rotation of second motor 52R.

A third or torso motor 92 rotates a torso link spindle 94 that is mounted to a bottom surface of torso link 11, to which robot arm mechanism 10R is rotatably mounted. A main ring 96 supports a bearing assembly 98 around which spindle 94 rotates. Motor 92 is capable of 360 degree continuous rotation about central axis 13 and therefore can, in cooperation with robot arm mechanism 10R, move hand 30R along an irregular path to any location within the reach of hand 30R.

Figure 3:
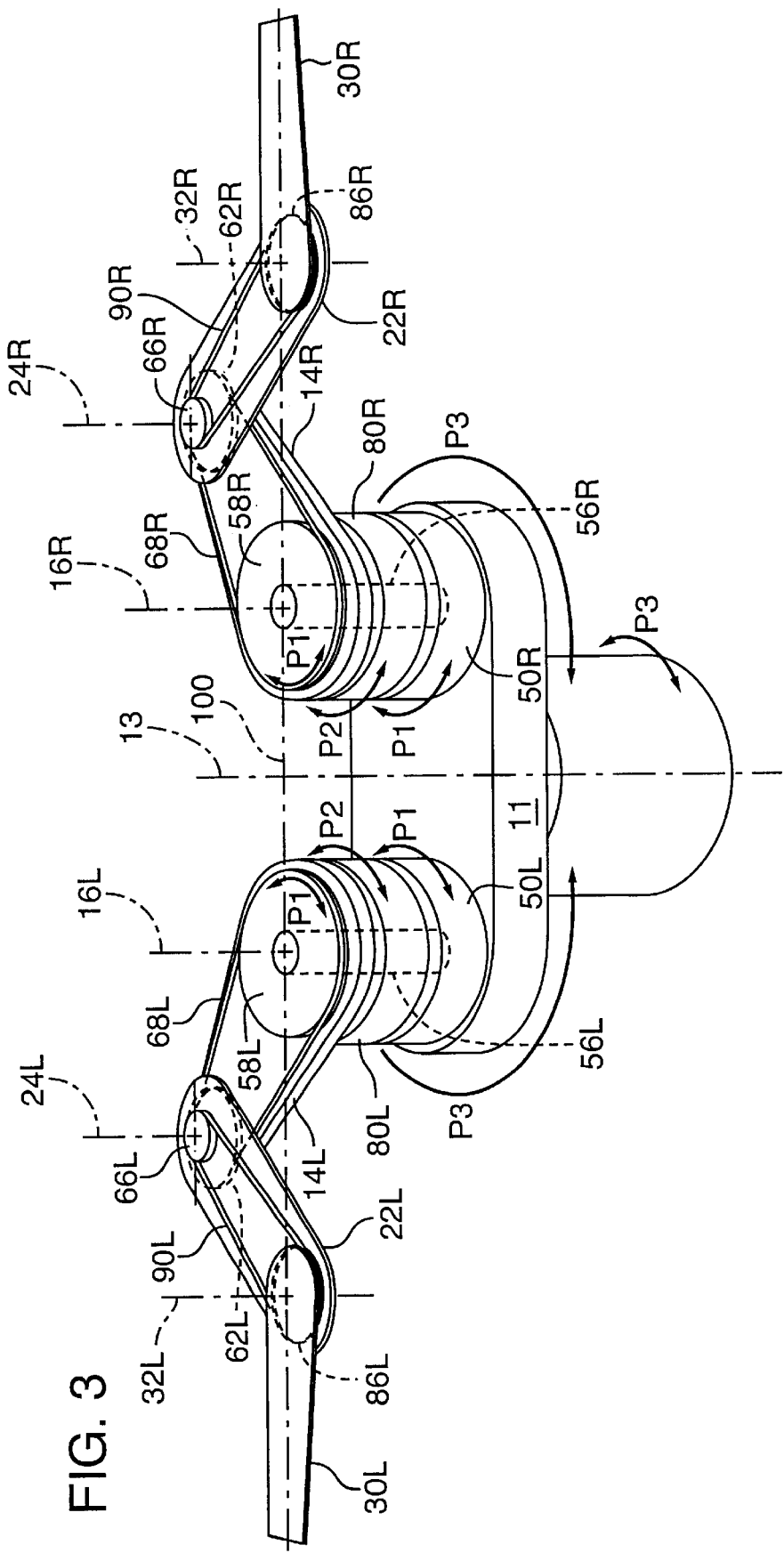
FIG. 3 is an isometric view in stick diagram form showing the rotational motion imparted by the motor drive links of the mechanical linkage of the robot arm system of FIGS. 1A, 1B, and 1C.

Motor controller 54 (FIGS. 6A and 6B) controls motors 50R and 52R in two preferred operational states to enable robot arm mechanism 10R to perform two principal motion sequences. The first motion sequence changes the extension or radial position of hand 30R, and the second motion sequence changes the angular position of hand 30R relative to shoulder axis 16R. FIG. 3 is a useful diagram for showing the two motion sequences.

With reference to FIGS. 2 and 3, in the first operational state, motor controller 54 causes first motor 50R to maintain the position of forearm spindle 56R and second motor 52R to rotate upper arm spindle 80R. The non-rotation of first motor 50R maintains the position of upper arm pulley 58R, and the rotation of upper arm spindle 80R by second motor 52R rotates upper arm 14R about shoulder axis 16R, thereby causing rotation of forearm 22R about elbow axis 24R and counter-rotation of hand 30R about wrist axis 32R. Because the ratio of the diameters of upper arm pulley 58R and the outer surface of bearing 62R are 4:2 and the ratio of the diameters of forearm pulley 66R and the outer surface of bearing 86R is 1:2, the rotation of upper arm 14R in a direction specified by $P_2$ shown in FIG. 3 will cause hand 30R to move along a straight line path 100. (The diameters of forearm pulley 66R and the outer surface of bearing 86R are one-half of the diameters of, respectively, the outer surface of bearing 62R and upper arm pulley 58R to streamline the sizes and shapes of forearm 22R and hand 30R.)

Whenever upper arm 14R rotates in the clockwise direction specified by $P_2$, hand 30R extends (i.e., increases radial distance from shoulder axis 16R) along path 100. Whenever upper arm 14R rotates in the counter-clockwise direction specified by $P_2$, hand 30R retracts (i.e., decreases radial distance from shoulder axis 16R) along path 100. Skilled persons will appreciate that robot arm mechanism 10 in a mirror image configuration of that shown in FIG. 3 would extend and retract in response to upper arm 14 rotation in directions opposite to those described. FIG. 1B shows that when robot arm mechanism 10R is extended, axes 13, 16R, 24R, and 32R are collinear.

In the second operational state, motor controller 52R causes first motor 50R to rotate forearm spindle 56R in the direction specified by $P_1$ and second motor 52R to rotate upper arm spindle 80R in the direction specified by $P_2$. In the special case in which motors 50R and 52R are synchronized to rotate in the same directions by the same amount of displacement, hand 30R is only angularly displaced about shoulder axis 16R. This is so because the rotation of forearm 22R about elbow axis 24R caused by the rotation of first motor 50R and the rotation of hand 30R about wrist axis 32R caused by rotation of second motor 52R and the operation of the passive drive link offset each other to produce no net rotation about elbow axis 24R and wrist axis 32R. Thus, hand 30R is fixed radially at a point along path 100 and describes a circular path as only upper arm 14R rotates about shoulder axis 16R. By application of kinematic constraints to achieve a desired travel path for hand 30, motor controller 54 can operate first and second motors 50R and 52R to move robot arm mechanism 10R along non-radial straight line paths, as will be further described below.

Skilled persons will appreciate that to operate robot arm mechanism 10R, first and second motors 50R and 52R are coupled by either rotating both of them or grounding one while rotating the other one. For example, robot arm mechanism 10R can be operated such that forearm 22R rotates about elbow axis 24R. Such motion would cause hand 30R to describe a simple spiral path between shoulder axis 16R and the full extension of hand 30R. This motion is accomplished by fixing the position of shoulder 14R and operating motor 50R to move forearm 22R. Applicants note that the prior art described above is incapable of rotating the elbow joint without also rotating the shoulder joint, thereby requiring the operation of two motors.

Motor controller 54 controls the operation of torso motor 92 and therefore the rotation of torso link 11 in a direction specified by $P_3$ independently of the operational states of motors 50R and 52R.

FIGS. 4A and 4B show the interior components, mechanical linkage, and fluid pressure conduits of robot arm mechanism 10R shown in FIGS. 1A, 1B, and 1C. With reference to FIGS. 4A and 4B, a motor housing composed of an interior portion of torso link 11 and a cylindrical spacer 15R contains first motor 50R and second motor 52R arranged in concentric relation such that their respective forearm spindle 56R and upper arm spindle 80R rotate about shoulder axis 16R. Forearm spindle 56R is positioned nearer to shoulder axis 16R and is directly connected to upper arm pulley 58R journalled for rotation on bearings 102R. Upper arm spindle 80R is positioned farther radially from shoulder axis 16R and is directly connected to bottom surface 82R of upper arm 14R journalled for rotation on bearings 104R. The angular positions of motors 50R and 52R are tracked by respective glass scale encoders 106R and 108R. Encoders 106R and 108R include respective annular diffraction grating scales 110R and 112R and respective light source/detector subassemblies (not shown). Such glass scale encoders are known to skilled persons.

Base housing 12 contains motor 92, which is arranged such that torso link spindle 94 journalled on bearings 98 rotates about central axis 13. The angular position of motor 92 is tracked by a glass scale encoder 118 of a type similar to encoders 106R and 108R.

Robot arm system 8 includes two separate fluid pressure conduits 124L and 124R each including multiple path segments, with conduit 124L extending between fluid pressure inlet 38L and outlet 36L of fluid pocket or land 126L and conduit 124R extending between fluid pressure inlet 38R and outlet 36R of land 126R. In the preferred embodiments described, the fluid pressure conduits deliver vacuum pressure but are capable of delivering positive amounts of fluid pressure. Each of path segments 128L and 128R in base housing 12 and of path segments 129L and 129R in torso link 11 is partly a flexible hose and partly a hole in a solid component.

Path segments 130R, 132R, and 134R in the respective upper arm 14R, forearm 22R, and hand 30R are either channels formed by complementary depressions in mating components or holes passing through solid components. Outlet 36R constitutes a hole in vacuum land 126R on the specimen-contacting surface of hand 30R.

Each path segment terminating or originating at shoulder axis 16R, elbow axis 24R, and wrist axis 32R includes a rotary fluid slip ring 136 that functions as a vacuum feedthrough conduit that permits continuous rotation about any one of these three axes. Path segments 128R and 129R are joined at central axis 13 by an enlarged version of a rotary multiple fluid-passageway spool 300, which rotates within a bearing assembly 120 supported by main ring 96. Spool 300 is described below with reference to FIGS. 9A and 9B in connection with the detailed description of the alternative preferred embodiment.

Figure 5B:
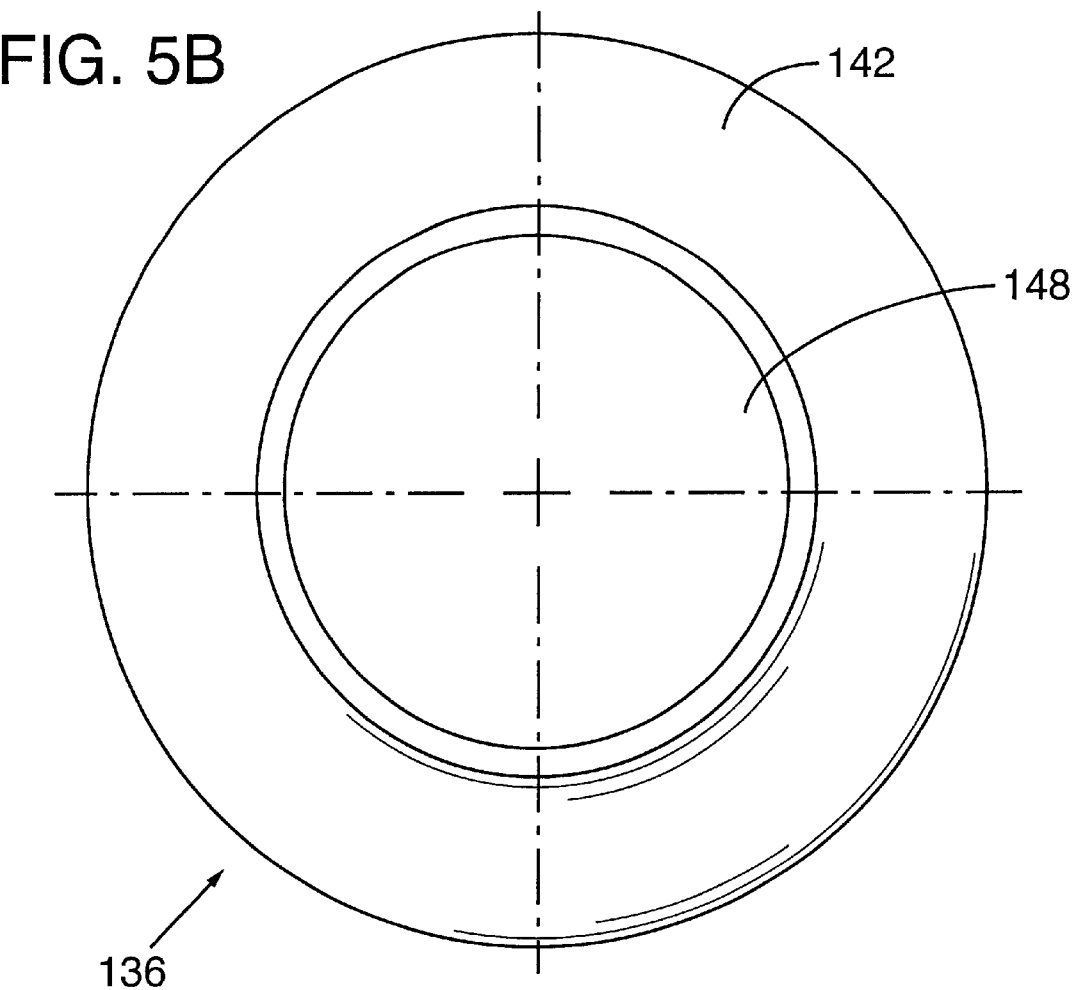
FIGS. 5A and 5B are respective side elevation and plan views of a rotary fluid slip ring installed at each rotary joint of the robot arm system of FIGS. 1A, 1B, and 1C.
Figure 5A:
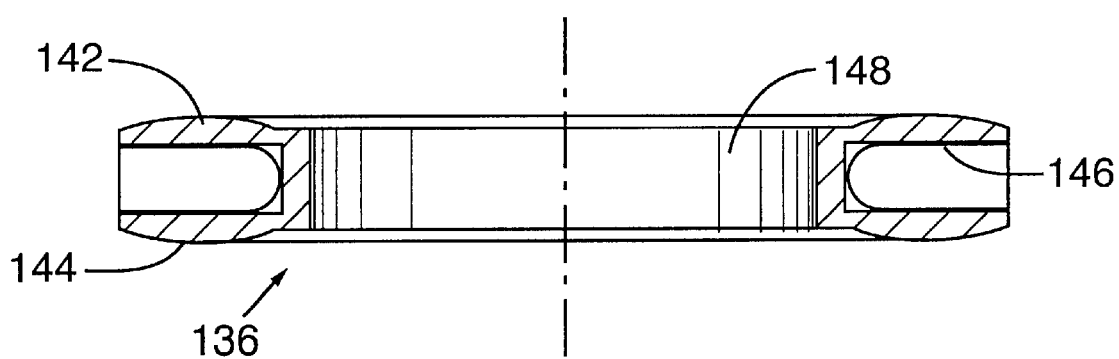

FIGS. 5A and 5B show rotary fluid slip ring 136, which is fitted into each of the rotary joints at shoulder axis 16R, elbow axis 24R, and wrist axis 32R. For purposes of convenience only, the following describes the operation of slip ring 136 in the rotary joint defining wrist axis 32R.

With reference to FIGS. 4A, 4B, 5A, and 5B, slip ring 136 includes a convex upper surface 142 and a convex lower surface 144 separated by an annular leaf spring 146. Each of surfaces 142 and 144 is preferably made of a reinforced Teflon® co-polymer and has a central aperture 148. When it is fitted in a rotary joint, slip ring 136 receives through central aperture 148 a protrusion 150 from the top surface of post 84R that extends from distal end 26R of forearm 22R. Protrusion 150 has a hole 152 that extends into and through post 84R along its entire length and is in fluid communication with vacuum path segment 132R within forearm 22R. The wrist joint formed by forearm 22R and hand 30R causes upper surface 142 to fit against an interior vacuum channel surface 154R of hand 30R and lower surface 144 to fit against a depression 156R in the top surface of post 84R. The raised upper and lower surfaces 142 and 144 compress against leaf spring 146 and form a vacuum seal for the space between the top of protrusion 150 and vacuum channel surface 154R of hand 30R. The reinforced co-polymer material from which upper surface 142 is made forms a bearing surface that maintains a vacuum-tight seal during rotary motion about wrist axis 32R.

The mechanical construction of robot arm mechanism 10 does not restrict hand 30R to straight line motion but provides two degrees of freedom to achieve complex trajectories. This is beneficial because it facilitates specimen processing layouts to provide relatively small footprints and processing component placements that enhance ergonomic loading of specimens. A common application is to access specimens in straight line rather than complex hand movements. Thus, the following description gives an example of how a skilled person would implement controller 54 to carry out this common specimen access operation.

FIG. 6A is a diagram that specifies a local coordinate axis frame whose axes are defined by the orientation of a semiconductor wafer cassette $168_r$ and its location relative to shoulder axis 16R. With reference to FIG. 6A, the following description sets forth the mathematical expressions from which are derived the command signals controller 54 uses to retrieve from cassette $168_r$ a wafer $170_r$ along a vector perpendicular to the opening of cassette $168_r$.

The following parameters are pertinent to the derivation of the path of travel of hand 30:

$\theta_S$=angle of motor 52R $\theta_E$=angle of motor 50R r=distance between shoulder axis 16R and elbow axis 24R and distance between elbow axis 24R and wrist axis 32R β=angle between upper arm 14R and forearm 22R p=length of hand 30R E=2r=extension of robot arm $R_i$=reach of robot arm (i.e., its radius measured from shoulder axis 16R to the center $172_r$ of wafer $170_r$ positioned on hand 30R).

Application of the law of cosines provides the following expressions for $R_i$:

$$R_i = p + \sqrt{(r^2 + r^2 - 2r^2\cos\beta)} \quad (1)$$
$$= p + \sqrt{2}\, r\sqrt{(1-\cos\beta)}.$$

For β=0, equation (1) provides that $R_i$=p and x=0, y=0, $\Theta_S = \Theta_{S_R}$, $\Theta_E = \Theta_{E_R}$. The quantities $\Theta_{S_R}$ and $\Theta_{E_R}$ represent reference motor angles. The motor angles may be expressed as $\Theta_S = \Theta S_R + \Delta\Theta_{S_R}$, $\Theta_E = [<b]old73_{E_R} + \Delta\Theta_{E_R}$. The angle β may be expressed as $\beta = 2(\Delta\Theta_{S_R} - \Delta\Theta_{E_R})$ because of the construction of the mechanical linkages of robot arm mechanism 10R. This equation relates the angle β to changes in the motor angles.

To retrieve wafer $170_r$ from cassette $168_r$ along a straight line path, the displacement along the X-axis equals $X_0$, which is a constant. Thus, X(t)=X0. The quantity X(t) can be expressed as a function of the lengths of the X-axis components of its links:

$$X(t) = r\cos\Theta_1 + r\cos\Theta_2 + p\cos\Theta p, \quad (2)$$

in which $\theta_1$=angle of upper arm 14R $\theta_2$=angle of forearm 22R $\theta_p$=angle of hand 30R.

Because upper arm 14R and forearm 22R are of the same length (r), $\theta_1$ tracks the angle $\theta_S$ of motor 52R, and hand 30R moves in a straight line, the following expressions hold:

$$\Theta_1 = \Theta_S$$
$$\Theta_2 = \Theta_1 + \pi - \beta$$
$$\Theta_p = \Theta_i + \left(\frac{\pi - \beta}{2}\right).$$

Thus, to compute $X_0$, one substitutes the foregoing identities for $\theta_1$, $\theta_2$, and $\theta_p$ into equation (2) for X(t) and finds:

$$X_0 = r(\cos\Theta_1 + \cos\Theta_2) + p\cos\Theta_p \quad (3)$$
$$X_0 = r(\cos\Theta_1 + \cos(\Theta_1 + \pi - \beta)) + p\cos\left(\Theta_1 + \frac{\pi}{2} - \frac{\beta}{2}\right)$$

$$X_0 = r(\cos\Theta_1 - \cos(\Theta_1 - \beta)) - p\sin\left(\Theta_1 - \frac{\beta}{2}\right).$$

Equation (3) expresses the constraint that sets but the relationship between the angles $\theta_S$ and $\theta_E$ of motors 52R and 50R operating to move equal angular distances to achieve straight line movement of hand 30R.

Skilled persons can implement constraint equation (3) by means of a servomechanism controller in any one of a number of ways. For example, to achieve high speed operation to implement a given wafer move profile one can compute from equation (3) command signal values and store them in a look-up table for real-time use. The precomputation process would entail the indexing of $\theta_S$ in accordance with the wafer move profile and determining from equation (3) the corresponding $\theta_E$ values, thereby configuring the displacement of $\theta_S$ and $\theta_E$ in a master-slave relationship.

To achieve angular displacement of hand 30R about shoulder axis 16R, controller 54 causes motors 50R and 52R to rotate in the same direction through the desired angular displacement of hand 30R to reach the desired destination. The linear extension of hand 30R does not change during this move. Skilled persons will appreciate that complicated concurrent linear and angular displacement move profiles of hand 30R could be accomplished by programming controller 54 to operate motors 50R and 52R through different angular displacements. FIG. 6A shows a second wafer cassette $168_l$ positioned so that the center $172_l$ of a stored wafer $170_l$ is coincident to $Y_0$. The parallel arrangement of the openings of cassettes $168_l$ and $168_r$ demonstrates that the above expressions can be used to retrieve wafers stored in cassettes not positioned a radial distance from shoulder axis 16. Such nonradial placement is not implemented in the prior art references described above. Robot arm mechanism 10 is not restricted to radial placement but can accommodate any combination of distances within its reach.

FIG. 6B is a simplified block diagram showing the primary components of controller 54. With reference it to FIG. 6B, controller 54 includes a program memory 174 that stores move sequence instructions for robot arm mechanism 10R. A microprocessor 176 receives from program memory 174 the move sequence instructions and interprets them to determine whether the first or second operational state is required or whether motion of motor 92 is required to position torso link 11. A system clock 178 controls the operation of microprocessor 176. A look-up table (LUT) 180 stores corresponding values for $\theta_S$ (motor 52R) and $\theta_E$ (motor 50R) to accomplish the straight line motion of the first operational state and the angular displacements of $\theta_S$ and $\theta_E$ to accomplish the angular motion of the second operational state. Because the rotation of torso link 11 is independent of the motions of the robot arm mechanisms mounted to it, the overall coordination of the angular displacement of motor 92 with the angular displacements of motors 50R and 52R is carried out in the move sequence instructions, not in LUT 180. This results in higher speed and more accurate straight line motion because multiple axis servomechanism following errors and drive accuracy errors do not affect the straight line path of hand 30R.

Microprocessor 176 provides $\theta_S$ and $\theta_E$ position signals to a servomechanism amplifier 182, which delivers $\theta_S$ and $\theta_E$ command signals to motors 52R and 50R, respectively. Microprocessor 176 also provides position signals to servomechanism amplifier 176 to deliver a command signal to torso motor 92. Servomechanism amplifier 182 receives from glass scale encoders 106, 108, and 118 signals indicative of the angular positions of the respective motors 50R, 52R, and 92.

Microprocessor 176 also provides control signals to a vacuum valve controller 184, which causes a vacuum valve (not shown) to provide from a vacuum source (not shown) an appropriate amount of vacuum pressure to outlet 36 in response to the need to hold a wafer on or release a wafer from hand 30R.

FIGS. 7A and 7B show an alternative one-arm, multiple link robot arm system 208 of similar design to robot arm system 8 with the significant exceptions that robot arm mechanism 10L is absent and the consequent excess length of torso link 11 is removed, and an end effector structure 230 having two oppositely extending hands 30, and 302 is substituted for hand 30R. FIGS. 8A and 8B show the interior components, mechanical linkage, and vacuum pressure line paths of robot arm mechanism 208. Because of the similarity of robot arm systems 8 and 208, their corresponding components and axes of rotation are identified by identical reference numerals. For purposes of clarity, the suffix "R" has been omitted.

With reference to FIGS. 7A and 7B, end effector structure 230 includes oppositely extending hands 30, and $30_2$ that rotate about wrist axis 32. Because they retrieve and deliver separate specimens, hand $30_1$ has a vacuum land $126_1$ with an outlet $36_2$ and hand $30_2$ has a vacuum land $126_2$ with an outlet $36_2$ that are connected to separate vacuum pressure conduits routed within base housing 12, torso link 11, upper arm 14, and forearm 22.

With reference to FIGS. 8A-1 and 8A-2 (collectively, "FIG. 8A") and FIG. 8B, robot arm mechanism 210 includes two separate vacuum pressure conduits $124_1$ and $124_2$ each including multiple path segments, with conduit $124_1$ extending between vacuum pressure inlet $38_1$ and outlet $36_1$ of vacuum land $126_1$ and conduit $124_2$ extending between vacuum pressure inlet $38_2$ and outlet $36_2$ of vacuum land $126_2$. Path segments $128_1$ and $128_2$ of the respective conduits $124_1$ and $124_2$ are flexible hoses. Path segments $129_1$ and $129_2$ in torso link 11, path segments $130_1$ and $130_2$ in upper arm 14, path segments $132_1$ and $132_2$ in forearm 22, and path segments $134_1$ and $134_2$ in the respective hands $30_1$ and $30_2$ are either channels formed by complementary depressions in mating components or holes passing through solid components.

Figure 9B:
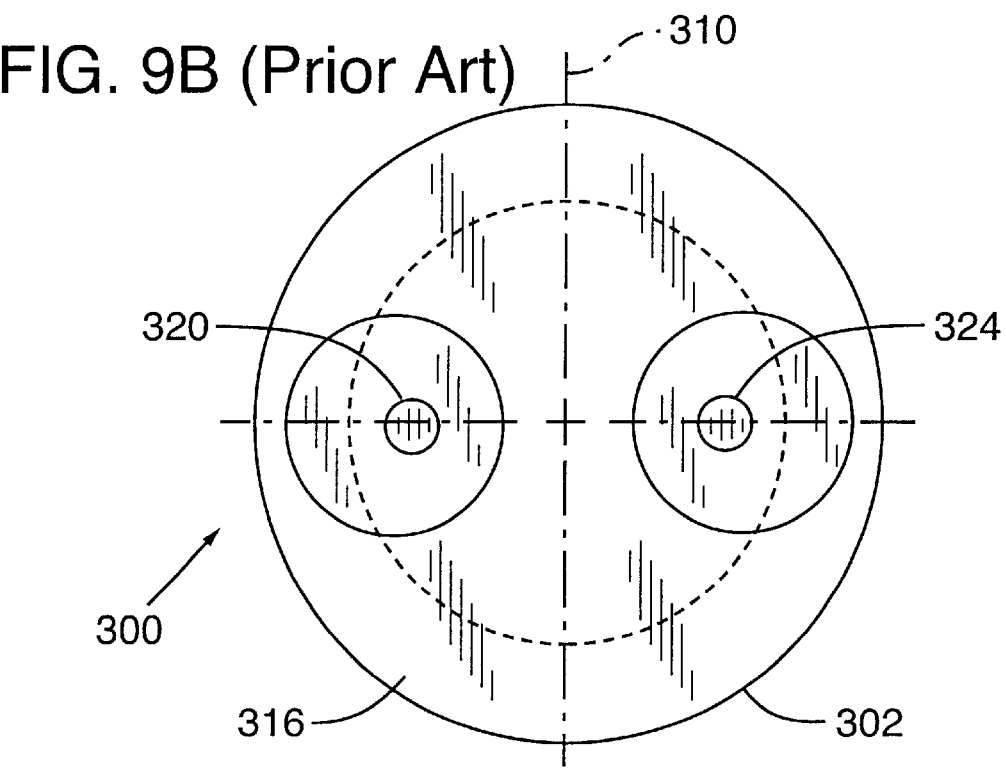
FIGS. 9A and 9B are respective side elevation and plan views of the rotary multiple fluid-passageway spool installed in each rotary joint of the robot arm system of FIGS. 8A and 8B.
Figure 9A:
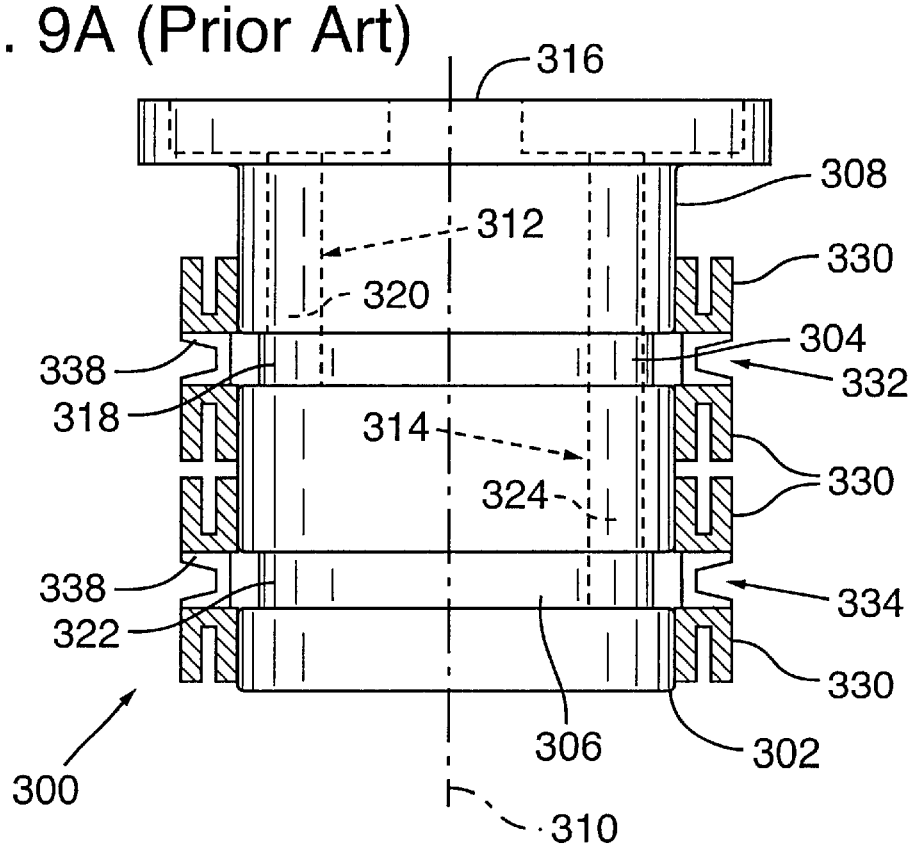

Outlets $36_1$ and $36_2$ constitute holes in the respective vacuum lands $126_1$ and $126_2$. Each path segment of conduits $124_1$ and $124_2$ terminating or originating at central axis 13, shoulder axis 16, elbow axis 24, and wrist axis 32 includes a rotary multiple fluid-passageway spool 300 that functions as two independent vacuum feedthrough conduits that permit continuous rotation about any one of these four axes. The placement of spool 300 fitted in each of the three rotary joints of robot arm mechanism 210 is shown in FIGS. 8A and 8B. FIGS. 9A and 9B show the design detail of a prior art rotary multiple fluid-passageway spool 300.

With reference to FIGS. 8A, 8B, 9A, and 9B, spool 300 comprises a solid metal cylindrical body 302 having two spaced-apart grooves 304 and 306 formed in and encircling its outer side surface 308 about a longitudinal axis 310. Two separate vacuum pressure delivery channels 312 and 314 are formed within and pass through body 302. (Comparison of FIGS. 8A and 8B with FIG. 9B reveals that vacuum pressure delivery channels 312 and 314 formed within body 302 by artistic license are drawn rotated by 90 degrees in FIG. 8A only to show clearly the vacuum pressure conduits.) Each of channels 312 and 314 has two passageway segments, one originating in a groove and the other terminating at a top surface 316 of body 302. More specifically, for channel 312, a passageway segment 318 extends inwardly from groove 304 in a direction transverse to longitudinal axis 310 and intersects with a passageway segment 320 at a right angle juncture. Passageway segment 320 extends upwardly toward and through top surface 316 in a direction parallel to longitudinal axis 310. Similarly, for channel 314, a passageway segment 322 extends inwardly from groove 306 in a direction transverse to longitudinal axis 310 and intersects with a passageway segment 324 at a right angle juncture. Passageway segment 324 extends upwardly toward and through top surface 316 in a direction parallel to longitudinal axis 310.

For purposes of convenience only, the following describes the operation of spool 300 in the rotary joint defining wrist 32. When spool 300 is fitted into forearm 22, four seal rings 330 spaced above, between (two seals), and below grooves 304 and 306 form two annular gas spaces 332 and 334 between side surface 308 of spool 300 and an interior surface 336 of forearm 22. Spacers 338 that extend about 330 degrees around spool 300 in grooves 304 and 306 maintain the desired separation between adjacent seal rings 330. Vacuum path segments $134_1$ and $134_2$ terminate in the respective gas spaces 332 and 334 and their corresponding holes in top surface 316 of spool 300, thereby coupling the vacuum pressure supply to and from spool 300.

Figure 10:
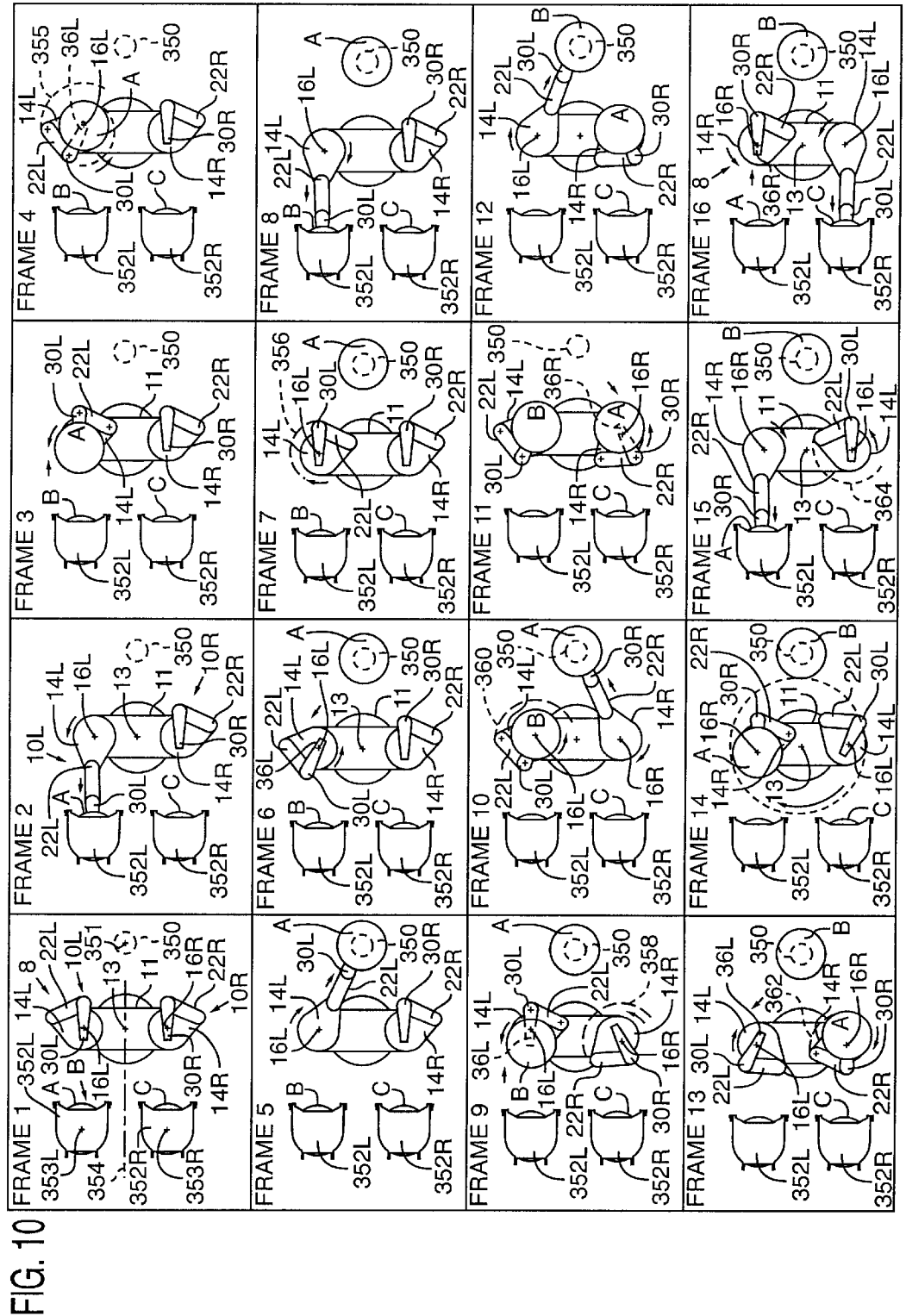
FIG. 10 shows in a series of 16 frames the various positions of the two-arm, multiple link robot arm system of FIGS. 1A, 1B, and 1C as it retrieves two specimens from two parallel-aligned storage locations and sequentially places the two specimens temporarily at a process location.

FIG. 10 includes 16 frames showing various positions of robot arm mechanisms 10L and 10R of robot arm system 8 in an exemplary operational sequence that moves a wafer A from a left-side wafer cassette 352L to a processing station 350 (such as a cooling platform) and back to left wafer cassette 352L, moves a wafer P from left wafer cassette 352L to processing station 350, and retrieves a wafer C from a right-side wafer cassette 352R.

In this example, in the initial position shown in frame 1, left shoulder axis 16L is radially positioned 40.0 centimeters (15.8 inches) from an effective center. 351 of processing station 350 and an effective center 353L of cassette 352L. Right shoulder axis 16R is radially positioned 40.0 centimeters (15.8 inches) from center 351 of processing station 350 and an effective center 353R of cassette 352R. Axes 16L and 16R and centers 353L and 353R define four corners of a rectangle with axes 16L and 16R being spaced apart a distance of 35.5 centimeters (14.0 inches) and cassettes 352L and 352R being spaced apart a distance of 35.5 centimeters (14.0 inches) from center to center. Cassettes 352L and 352R are spaced apart from respective axes 16R and 16L a non-radial distance of 53.5 centimeters (21.1 inches) measured along the respective diagonals of the rectangle. Torso movement rotation of shoulders 14L and 14R, as shown in frame 14, radially positions axes 16L and 16R a distance of 40.0 centimeters (15.8 inches) from effective centers 353R and 353L.

The following description tracks the angular displacement of torso link 11 about central axis 13, upper arm 14R about shoulder axis 16R, and upper arm 14L about shoulder axis 16L to demonstrate the continuous rotation capabilities of torso link 11 and the mechanical links in robot arm mechanisms 10R and 10L.

Frame 1 shows the initial positions of hands 30L and 30R retracted and in line with the openings of the respective cassettes 352L and 352R. In these initial positions, the central longitudinal axis of upper arm 14L (i.e., a line connecting axes 16L and 24L) is angularly displaced 67.5 degrees in a counter-clockwise direction from a reference line 354, and the central longitudinal axis of upper arm 14R (i.e., a line connecting axes 16R and 24R) is angularly displaced 67.5 degrees in a clockwise direction from reference line 354. Reference line 354 is perpendicular to a line connecting centers 353L and 353R.

Frame 2 shows upper arm 14L and forearm 22L cooperatively rotating in the first operational state of motor controller 54 to linearly extend hand 30L so as to reach and retrieve wafer A from cassette 352L. To accomplish this incremental movement, upper arm 14L rotated 112.5 degrees in a counter-clockwise direction about shoulder axis 16L.

Frame 3 shows upper arm 14L and forearm 22L cooperatively rotating in the first operational state of motor controller 54 to linearly retract hand 30L holding wafer A after the application of vacuum pressure at outlet 36L to secure wafer A to hand 30L. To accomplish this incremental movement, upper arm 14L rotated 112.5 degrees in a counter-clockwise direction about shoulder axis 16L.

Frame 4 shows upper arm 14L rotating 153.65 degrees in a counter-clockwise direction along a circular path segment 355 about shoulder axis 16L in the second operational state of motor controller 54 to keep hand 30L retracted while holding wafer A, hold forearm 22L stationary, and position hand 30L in line with processing station 350. Upon completion of this incremental movement, upper arm 14L exceeded a continuous 360 degree cycle of counter-clockwise rotation.

Frame 5 shows upper arm 14L and forearm 22L cooperatively rotating in the first operational state of controller 54 to linearly extend hand 30L so as to reach and place wafer A on processing station 350. To accomplish this incremental movement, upper arm 14L rotated 112.5 degrees in a clockwise direction about shoulder axis 16L.

Frame 6 shows upper arm 14L and forearm 22L cooperatively rotating in the first operational state of controller 54 to linearly retract hand 30L after the release of vacuum pressure at outlet 36L to leave wafer A at processing station 350. To accomplish this incremental movement, upper arm 14L rotated 112.5 degrees in a counter-clockwise direction about shoulder axis 16L.

Frame 7 shows upper arm 14L rotating 153.65 degrees in a clockwise direction along a circular path segment 356 about shoulder axis 16L in the second operational state of controller 54 to keep hand 30L retracted, hold forearm 22L stationary, and position hand 30L in line with cassette 352L.

Frame 8 shows upper arm 14L and forearm 22L cooperatively rotating in the first operational state of controller 54 to linearly extend hand 30L to retrieve wafer B from cassette 352L. To accomplish this incremental movement, upper arm 14L rotated 112.5 degrees in a clockwise direction:.about shoulder axis 16L.

Frame 9 shows simultaneous rotation of upper arms 14L and 14R. Upper arm 14L and forearm 22L cooperatively rotate in the first operational state of controller 54 to linearly retract hand 30L holding wafer B after the application of vacuum pressure at outlet 36L to secure wafer B to hand 30L. To accomplish this incremental movement, upper arm 14L rotated 112.5 degrees in a counter-clockwise direction about shoulder axis 16L. Upper arm 14R rotates 206.36 degrees in a counter-clockwise direction along a circular path segment 358 about shoulder axis 16R in the second operational state of controller 54 to keep hand 30R retracted, hold forearm 22R stationary, and position hand 30R in line with processing station 350.

Frame 10 shows simultaneous rotation of upper arms 14L and 14R. Upper arm 14L rotates 153.65 degrees in a counter-clockwise direction along a circular path segment 360 about shoulder axis 16L in the second operational state of controller 54 to keep hand 30L retracted while holding wafer B, hold forearm 22L stationary, and position hand 30L in line with processing station 350. Upper arm 14R and forearm 22R cooperatively rotate in the first operational state of motor controller 54 to linearly extend hand 30R so as to reach and retrieve wafer A from processing station 350. To accomplish this incremental movement, upper arm 14R rotated 112.5 degrees in a clockwise direction about shoulder axis 16R.

Frame 11 shows upper arm 14R and forearm 22R cooperatively rotating in the first operational state of controller 54 to linearly retract hand 30R holding wafer A after the application of vacuum pressure at outlet 36R to secure wafer A to hand 30R. To accomplish this incremental movement, upper arm 14R rotated 112.5 degrees in a counter-clockwise direction about shoulder axis 16R.

Frame 12 shows upper arm 14L and forearm 22L cooperatively rotating in the first operational state of motor controller 54 to linearly extend hand 30L so as to reach and place wafer B on processing station 350. To accomplish this incremental movement, upper arm 14L rotated 112.5 degrees in a clockwise direction about shoulder axis 16L.

Frame 13 shows simultaneous rotation of upper arms 14L and 14R. Upper arm 14L and forearm 22L cooperatively rotate in the first operational state of controller 54 to linearly retract hand 30L after the release of vacuum pressure at outlet 36L to leave wafer B at processing station 350. To accomplish this incremental movement, upper arm 14L rotated 112.5 degrees in a clockwise direction about shoulder axis 16L. Upper arm 14R rotates 26.35 degrees in a clockwise direction along a circular path segment 362 about shoulder axis 16R in the second operational state of controller 54 to keep hand 30R retracted while holding wafer A, hold forearm 22R stationary, and position hand 30R in line with, but facing a direction opposite from, cassette 352R.

Frame 14 shows torso link 11 rotating 180 degrees in a clockwise (or counter-clockwise) direction about central axis 13 to position hand 30L adjacent cassette 352R and hand 30R in line with cassette 352L.

Frame 15 shows simultaneous rotation of upper arms 14L and 14R. Upper arm 14R and forearm 22R cooperatively rotate in the first operational state of motor controller 54 to linearly extend hand 30R so as to reach and place wafer A in cassette 352L. To accomplish this incremental movement, upper arm 14R rotated 112.5 degrees in a clockwise direction about shoulder axis 16R. Upper arm 14L rotates 26.35 degrees in a counter-clockwise direction along a circular path segment 364 about shoulder axis 16L in the second operational state of controller 54 to keep hand 30L retracted, hold forearm 22L stationary, and position hand 30L in line with cassette 352R.

Frame 16 shows simultaneous rotation of upper arms 14L and 14R. Upper arm 14R and forearm 22R cooperatively rotate in the first operational state of controller 54 to linearly retract hand 30R after the release of vacuum pressure at outlet 36R to leave wafer A in cassette 352L. To accomplish this incremental movement, upper arm 14R rotated 112.5 degrees in a counter-clockwise direction about shoulder axis 16R. Upper arm 14L and forearm 22L cooperatively rotate in the first operational state of motor controller 54 to linearly extend hand 30L so as to reach and retrieve wafer C from cassette 352R. To accomplish this incremental movement, upper arm 14L rotated 112.5 degrees in a counter-clockwise direction about shoulder axis 16L.

In this example, upper arm 14L underwent bi-directional rotational movement and completed a continuous 378.65 degree cycle in a counter-clockwise direction about shoulder axis 16L before any clockwise counter-rotation. Torso link 11 underwent rotational movement and completed a continuous 180 degree cycle about central axis 13 without any counter-rotation. This example demonstrates an ability to make quick exchanges between stations in a layout with a reduced footprint. As a numerical example, because of its ability to collapse its arm links, a 21-inch (53 centimeters) diameter robot can manipulate two 12-inch (30.5 centimeters) wafers. Robot arm system 8 is also capable of moving hands 30L and 30R simultaneously to increase throughput.

Figure 11:
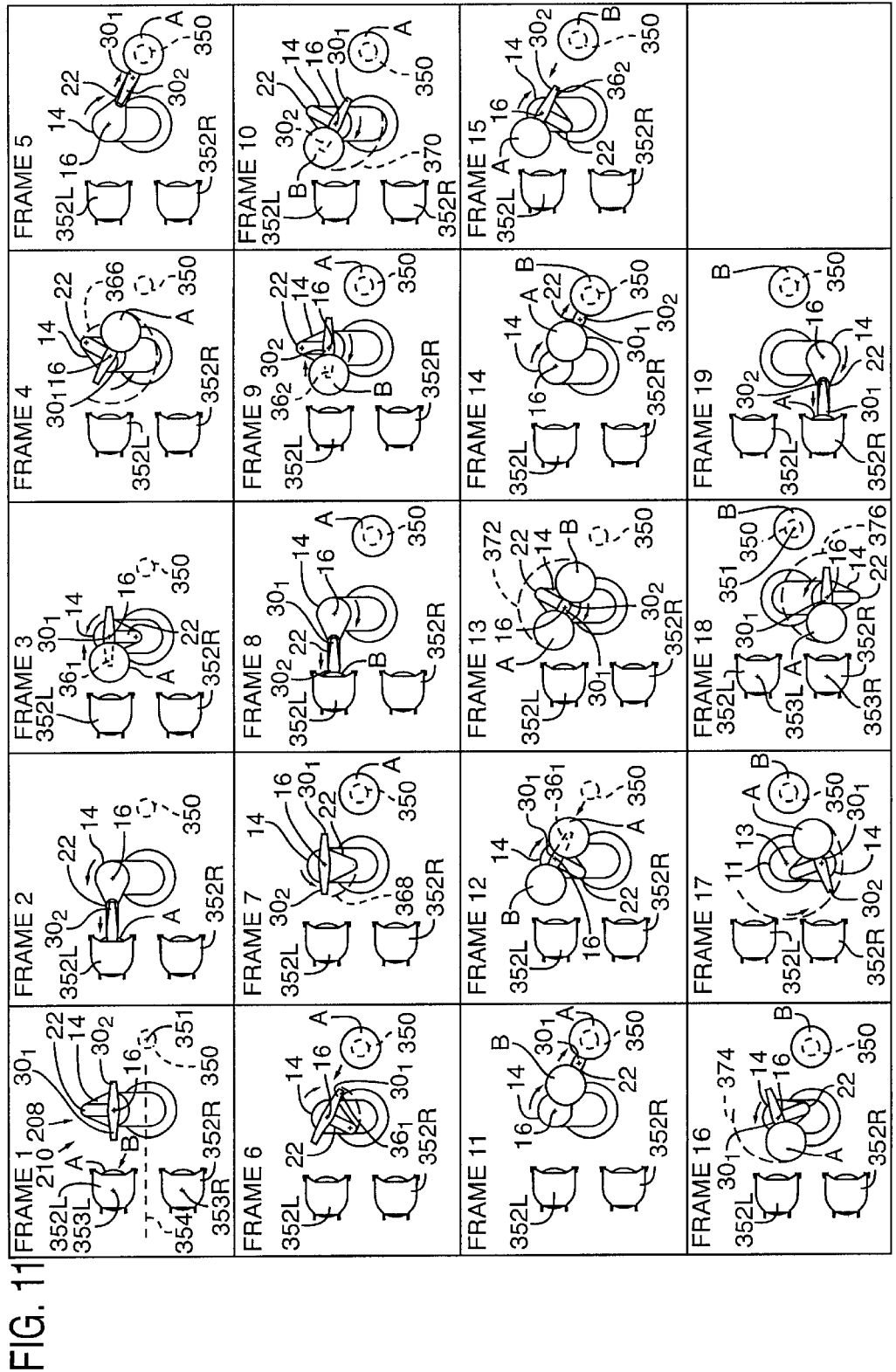
FIG. 11 shows in a series of 19 frames the various positions of a one-arm, two-hand multiple link robot arm system of FIGS. 7A and 7B as it retrieves two specimens from parallel-aligned storage locations and sequentially places the two specimens temporarily at a process location.

FIG. 11 includes 19 frames showing various positions of robot arm mechanism 210 of robot arm system 208 in an exemplary operational sequence that moves a wafer A from wafer cassette 352L to processing station 350 and to wafer cassette 352R, and moves a wafer B from wafer cassette 352L to processing station 350.

In this example, in the initial position shown in frame 1, shoulder axis 16 is radially positioned 40.0 centimeters (15.8 inches) from an effective center 351 of processing station 350 and an effective center 353L of cassette 352L. As shown in frame 18, shoulder axis 16 is radially positioned 40.0 centimeters (15.8 inches) from center 351 of processing station 350 and an effective center 353R of cassette 352R. The position of axis 16 in frame 1, the position of axis 16 in frame 18, and centers 353L and 353R define four corners of a rectangle with axes 16 (frame 1) and 16 (frame 18) being spaced apart by a distance of 35.5 centimeters (14.0 inches) and cassettes 352L and 352R being spaced apart by a distance of 35.5 centimeters (14.0 inches) from center to center. Cassettes 352L and 353R are spaced from respective axes 16 (frame 18) and 16 (frame 1) a non-radial distance of 53.5 centimeters (21.1 inches) measured along the respective diagonals of the rectangle. Torso movement rotation of shoulder 14, as shown in frame 17, radially positions axes 16 (frame 1) and 16 (frame 18) a distance of 40.0 centimeters (15.8 inches) from respective centers 353R and 353L.

The following description tracks the angular displacement of torso link 11 about central axis 13, upper arm 14 about shoulder axis 16, and hands $30_1$ and 302 of end effector 230 about wrist axis 32 to demonstrate the continuous rotation capabilities of torso link 11 and the mechanical links in robot arm mechanism 210.

Frame 1 shows the initial positions of hands $30_1$ and $30_2$ retracted and in line with the opening of cassette 352L, with hand $30_1$ facing in the direction of and nearer than hand $30_2$ to cassette 352L. In these initial a positions, the central longitudinal axis of upper arm 14 (i.e., a line connecting axes 16 and 24) is angularly displaced 90.00 degrees in a counter-clockwise direction from a reference line 354. Reference line 354 is perpendicular to a line connecting centers 353L and 353R.

Frame 2 shows upper arm 14 and forearm 22 cooperatively rotating in the first operational state of motor controller 54 to linearly extend hand 30, so as to reach and retrieve wafer A from cassette 352L. To accomplish this incremental movement, upper arm 14 rotated 90.00 degrees in a counter-clockwise direction about shoulder axis 16.

Frame 3 shows upper arm 14 and forearm 22 cooperatively rotating in the first operational state of motor controller 54 to linearly retract hand $30_1$ holding wafer A after the application of vacuum pressure at outlet $36_1$ to secure wafer A to hand $30_1$. To accomplish this incremental movement, upper arm 14 rotated 90.00 degrees, in a counter-clockwise direction about shoulder axis 16.

Frame 4 shows upper arm 14 rotating 153.65 degrees in a counter-clockwise direction along a circular path segment 366 about shoulder axis 16 in the second operational state of motor controller 54 to keep hand 301 retracted while holding wafer A, hold forearm 22 stationary, and position hand $30_1$ in line with processing station 350.

Frame 5 shows upper arm 14 and forearm 22 cooperatively rotating in the first operational state of controller 54 to linearly extend hand 30, so as to reach and place wafer A on processing station 350. To accomplish this incremental movement, upper arm 14 rotated 90.00 degrees in a clockwise direction about shoulder axis 16.

Frame 6 shows upper arm 14 and forearm 22 cooperatively rotating in the first operational state of controller 54 to linearly retract hand 30, after the release of vacuum pressure at outlet 36, to leave wafer A at processing station 350. To accomplish this incremental movement, upper arm 14 rotated 90.00 degrees in a clockwise direction about shoulder axis 16.

Frame 7 shows upper arm 14 rotating 26.35 degrees in a counter-clockwise direction along a circular path segment 368 about shoulder axis 16 in the second operational state of controller 54 to keep hand $30_2$ retracted, hold forearm 22 stationary, and position hand $30_2$ in line with cassette 352L.

Frame 8 shows upper arm 14 and forearm 22 cooperatively rotating in the first operational state of controller 54 to linearly extend hand 302 to retrieve wafer B from cassette 352L. To accomplish this incremental movement, upper arm 14 rotated 90.00 degrees in a clockwise direction about shoulder axis 16.

Frame 9 shows upper arm 14 and forearm 22 cooperatively rotating in the first operational state of controller 54 to linearly retract hand $30_2$ holding wafer B after the application of vacuum pressure at outlet $36_2$ to secure wafer B to hand $30_2$. To accomplish this incremental movement, upper arm 14 rotated 90.00 degrees in a clockwise direction about shoulder axis 16.

Frame 10 shows upper arm 14 rotating 26.35 degrees in a clockwise direction along a circular path segment 370 about shoulder axis 16 in the second operational state of controller 54 to keep hand $30_2$ retracted while holding wafer B, hold forearm 22 stationary, and position hand $30_1$ in line with and nearer than hand $30_2$ to processing station 350.

Frame 11 shows upper arm 14 and forearm 22 cooperatively rotating in the first operational state of controller 54 to linearly extend hand $30_1$ so as to reach and retrieve wafer A from processing station 350. To accomplish this incremental movement, upper arm 14 rotated 90.00 degrees in a clockwise direction about shoulder axis 16.

Frame 12 shows upper arm 14 and forearm 22 cooperatively rotating in the first operational state of motor controller 54 to linearly retract hand $30_1$ holding wafer A after the application of vacuum pressure at outlet $36_1$ to secure wafer A to hand $30_1$. To accomplish this incremental movement, upper arm 14 rotated 90.00 degrees in a clockwise direction about shoulder axis 16.

Frame 13 shows upper arm 14 rotating 180.00 degrees in a clockwise (or counter-clockwise) direction along a circular path segment 372 about shoulder axis 16 in the second operational state of motor controller 54 to keep hand $30_1$ retracted while holding wafer A, hold forearm 22 stationary, and position hand $30_2$ in line with processing station 350.

Frame 14 shows upper arm 14 and forearm 22 cooperatively rotating in the first operational state of controller 54 to linearly extend hand $30_2$ so as to reach and place wafer B on processing station 350. To accomplish this incremental movement, upper arm 14 rotated 90.00 degrees in a clockwise direction about shoulder axis 16.

Frame 15 shows upper arm 14 and forearm 22 cooperatively rotating in the first operational state of controller 54 to linearly retract hand $30_2$ after the release of vacuum pressure at outlet $36_2$ to leave wafer B at processing station 350. To accomplish this incremental movement, upper arm 14 rotated 90.00 degrees in a clockwise direction about shoulder axis 16. Upon completion of the incremental movements shown in frames 8–15, upper arm 14 underwent a continuous 746.35 degree cycle of clockwise rotation without any counter-rotation.

Frame 16 shows upper arm 14 rotating 45.00 degrees in a counter-clockwise direction along a circular path 374 about shoulder axis 16 in the second operational state of controller 54 to keep hand $30_1$ retracted while holding wafer A and hold forearm 22 stationary.

Frame 17 shows torso link 11 rotating 180 degrees in a clockwise (or counter-clockwise) direction about central axis 13 to position hand $30_2$ adjacent cassette 352R and hand $30_1$ adjacent, but facing a direction opposite from, cassette 352R.

Frame 18 shows upper arm 14 rotating 161.35 degrees in a counter-clockwise direction along a circular path 376 about shoulder axis 16 in the second operational state of controller 54 to keep hand $30_1$ retracted, hold forearm 22 stationary, and position hand $30_1$ in line with cassette 352R.

Frame 19 shows upper arm 14 and forearm 22 cooperatively rotating in the first operational state of motor controller 54 to linearly extend hand $30_1$ so as to reach and place wafer A in cassette 352R. To accomplish this incremental movement, upper arm 14 rotated 90.00 degrees in a clockwise direction about shoulder axis 16.

In this example, upper arm 14 underwent bi-directional rotational movement and completed a continuous 746.35 degree cycle in a clockwise direction about shoulder axis 16 without any counter-clockwise rotation. Torso link 11 underwent rotational movement and completed a continuous 180 degree cycle about central axis 11 without any counter-rotation.

Robot arm systems 8 and 208 provide different benefits, depending on the application. Robot arm 208 is more cost effective because it requires fewer parts to rotate the robot arm links around four axes, as compared with the six axes of robot arm system 8. Robot arm system 208 is faster and more compact for transporting large specimens because robot arm mechanism 210 requires less working space to sweep the specimen about the central axis. As a consequence, robot arm system 208 is more amenable to complex path planning. On the other hand, robot arm system 8 is easier to "teach" to perform the necessary hand movement to accomplish the exchange functions desired.

Robot arm systems 8 and 208 provide extended reach in that all links can be serially extended. To match the same length of extension, a conventional three-link robot arm mechanism would require a much greater footprint because of a limited ability to collapse its length. Moreover, there are geometrical limits to a reacharound capability with conventional three-link robot arm mechanisms, which perform linear moves by following a path defined by the radial line connecting the shoulder axis to the end of the hand. The present invention described above is capable of performing linear moves without following a radial path.

The above example presented with reference to FIGS. 6A and 6B shows side-by-side coplanar or parallel arrangement of the openings of wafer holders or carriers $168_l$ and $168_r$ and, therefore, represents a retrieval of wafers stored in carriers not positioned a radial distance from shoulder axis 16R. In a front-opening unified pod (FOUP)-based system, wafer carriers positioned side by side are often misaligned from their nominal coplanar opening arrangement relative to the robot arm mechanism. This condition typically results from misalignment of support structures on which support structure mounting elements such as kinematic coupling pin mountings are placed to receive the mounting features positioned on the bottom surfaces of the wafer carriers. Such misalignment could cause a robot arm mechanism to direct the hand or the wafer it carries to strike the wafer carrier instead of extend into its opening to, respectively, remove or replace a wafer. Misalignment can therefore result in contaminant particle creation stemming from impact of the hand or wafer against the wafer carrier.

The mathematical expressions derived with reference to FIG. 6A for the path of travel of hand 30, together with the angular positions of motors 50R and 52R tracked by the respective glass scale encoders 106R and 108R, provide position output information of robot arm mechanism 10R that can be used to compensate for this misalignment. (This assumes that the angular position of motor 92, which is tracked by glass scale encoder 118, remains fixed during movement of robot arm mechanism 10R.)

The position output information can be used to provide offset data for either mechanical alignment of the system components such as, for example, wafer carriers, or control the trajectory of robot arm mechanism 10R to compensate for support structure alignment offset. A misalignment correction technique carried out in accordance with the present invention entails the use of a component emulating fixture having mounting features that are matable to the support structure mounting elements. The emulating fixture preferably includes two upwardly extending, cylindrical locating features that are positioned to engage a fork-shaped end effector in two different extension positions. For manual correction, robot arm mechanism position output information provides the angular offset between the actual and nominal radial distances between the shoulder axis and the two locating features, one of which positioned at the effective center of a wafer properly stored in the wafer carrier. Position coordinates for proper alignment by manual repositioning is of any misaligned wafer carrier can then be derived. For automatic correction, robot arm mechanism position output information is used to derive a vector trajectory that causes the end effector to properly access the wafers stored in a misaligned wafer carrier.

FIGS. 12–19, together with their associated descriptions, present a self-teaching method with reference to a three-link robot arm mechanism 10 for a preferred use with FOUP-based system wafer carriers. Robot arm mechanism 10 is of the same design as that of each of robot arm mechanisms 10L and 10R.

FIG. 12 shows an upper surface 400 of a support structure 402 adapted to receive a front-opening wafer carrier 404 (FIG. 13A) for 300 mm diameter semiconductor wafers. Three kinematic coupling pins 406 are positioned on upper surface 400 in locations required under SEMI E47.1 (Mar. 5, 1998). A pivotable latch 408 includes a clamping finger 410 configured to mate with a carrier front retaining or clamping feature 412 (FIGS. 13B and 13C).

Figure 13B:
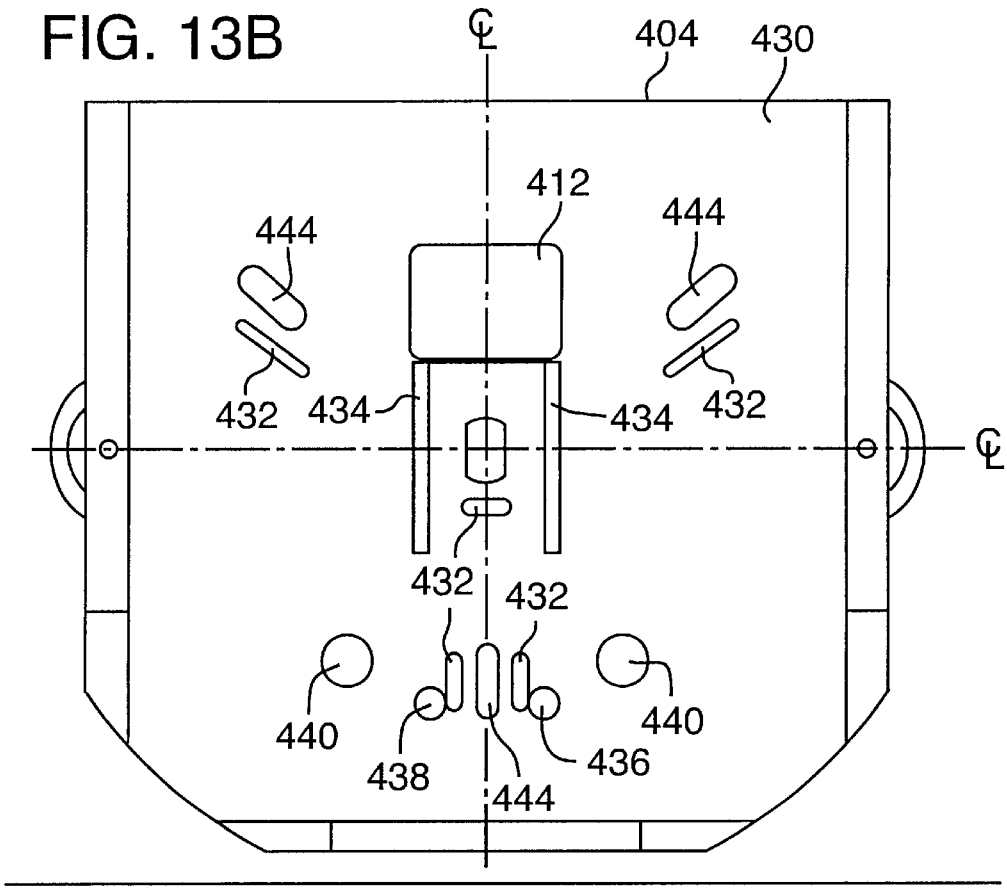
FIGS. 13B and 13C show, respectively, a bottom surface and a carrier front retaining feature on the bottom surface of the wafer carrier.
Figure 13C:
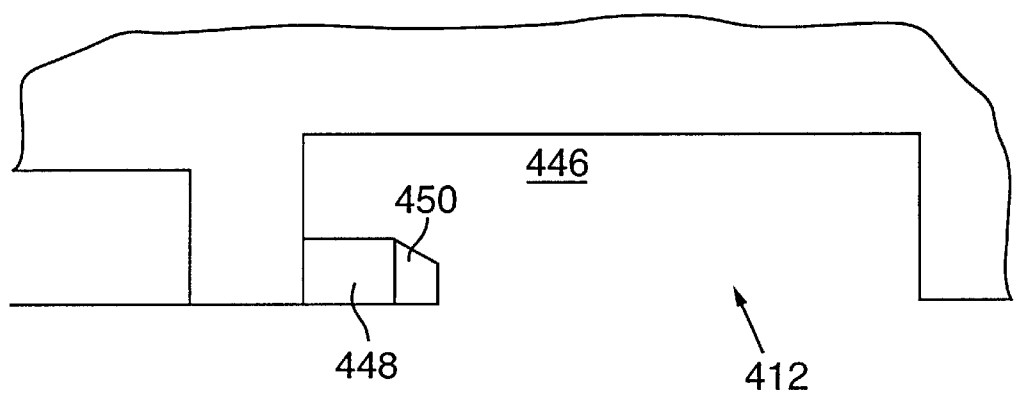

FIG. 13A shows wafer carrier 404 with its door (not shown) removed to reveal in the interior of wafer carrier 404 a wafer cassette 414 with its slots 416 spaced apart to accommodate stacked 300 mm diameter semiconductor wafers. FIGS. 13B and 13C show, respectively, a bottom surface 430 and carrier front retaining feature 412 on bottom surface 430 of wafer carrier 404. A preferred wafer carrier 404 is a model F300 wafer carrier manufactured by Fluoroware, Inc., Chaska, Minn.

With reference to FIG. 13B, wafer carrier 404 has on its bottom surface 430 five carrier sensing pads 432, two advancing carrier sensing pads 434, a carrier capacity (number of wafers) sensing pad 436, a carrier information pad 438, and one each of front end of line (FEOL) and back end of line (BEOL) information pads 440 required under SEMI E47.1 (Mar. 5, 1998). Three oblong, inwardly sloped depressions in bottom surface 430 form kinematic pin receiving features 444 that mate with kinematic coupling pins 406 (FIG. 12) fixed in corresponding locations on support structure 402 when wafer carrier 404 is properly installed. With reference to FIGS. 13B and 13C, a depression 446 partly covered by a projection 448 having a beveled surface 450 forms front retaining and clamping feature 412. Beveled surface 450 provides a ramp along which a wheel or roller can roll up to clamp against projection 448.

Figure 14A:
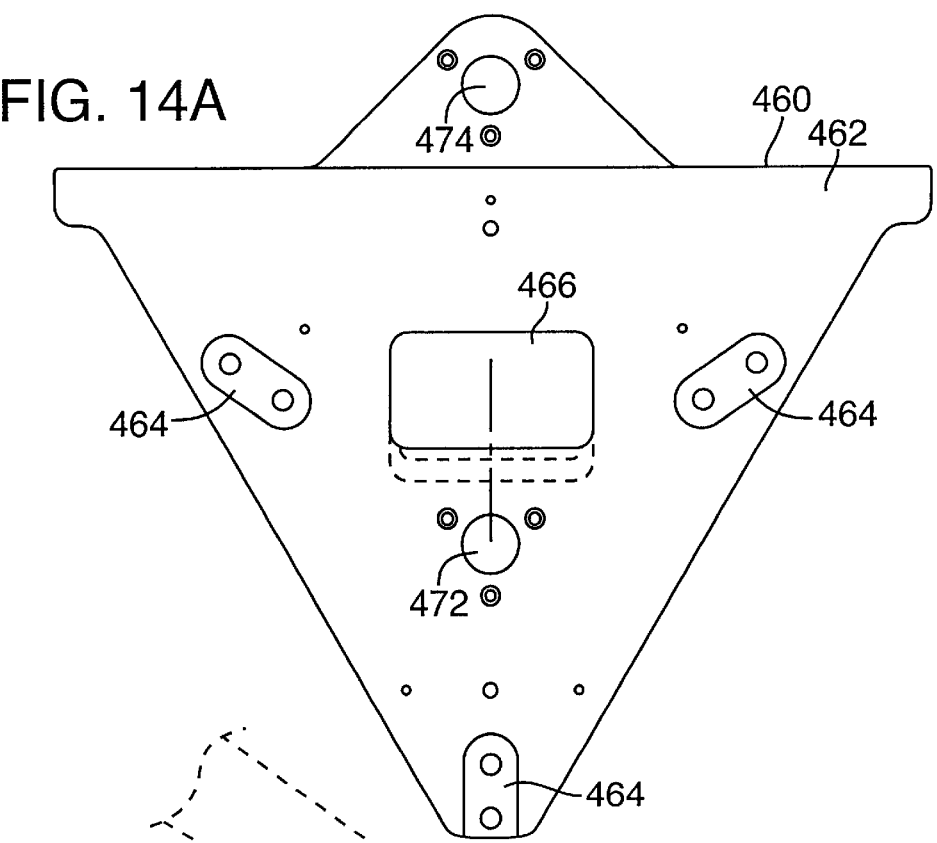
FIGS. 14A and 14B are respective bottom and top plan views of a component emulating fixture of the invention.
Figure 14B:
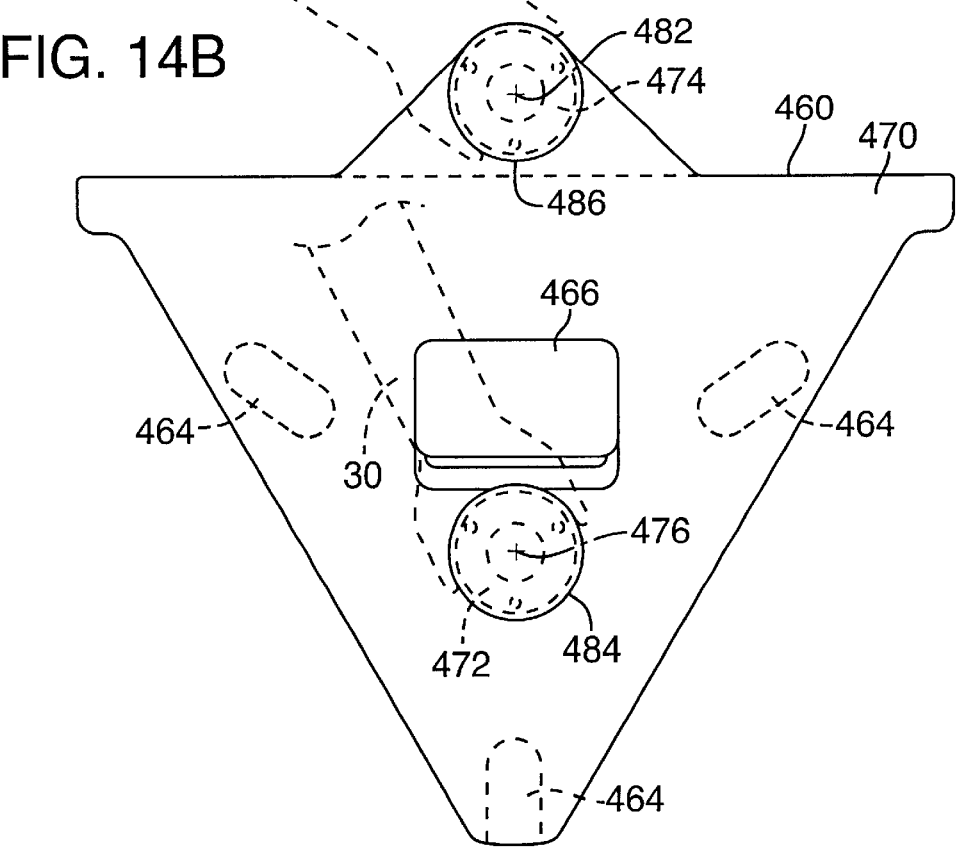

FIGS. 14A and 14B are respective bottom and top plan views of a component emulating fixture 460. With reference to FIG. 14A, fixture 460 is dimensioned to define a footprint that allows it to fit in the space occupied by wafer carrier 404 and includes in its bottom surface 462 three oblong, inwardly sloped depressions 464 and a carrier front retaining feature 466, all of which are of the same types and are positioned in the same corresponding locations as kinematic pin receiving features 444 and retaining feature 412 in bottom surface 430 of wafer carrier 404.

With reference to FIG. 14B, fixture 460 has extending upwardly from its upper surface 470 first and second locating features 472 and 474 of preferably cylindrical shape with different heights. Locating feature 472 is positioned so that its longitudinal axis 476 is preferably set at the location of the effective center 478 of a wafer 480 stored in wafer cassette 414, and locating feature 474 is positioned so that its longitudinal axis 482 is preferably set forward of the location of the open front of wafer carrier 404. Locating feature 472 is taller than locating feature 474, and the free ends of locating features 472 and 474 terminate in respective top caps 484 and 486. The functions of locating features 472 and 474 are described below. Fixture 460 fits in the work space dedicated for occupancy by wafer carrier 404 and is matable, therefore, to the mounting elements, including kinematic coupling pins 406 and clamping feature 412, provided in upper surface 400 of support structure 402.

FIGS. 15A and 15B are respective diagrammatic cross-sectional and rear end elevation views of fixture 460. FIG. 15A shows the detail of the shape of and features provided in bottom surface 462 of fixture 460, and FIG. 15B shows the fit of a kinematic coupling 406 within the depression 464 located nearest the rear of bottom surface 462 of fixture 460. FIGS. 15A and 15B show that the height of locating feature 474, defined with reference to the top surface of top cap 486, is set to the position of the bottom wafer stored in wafer cassette 414. Locating feature 472 is taller than locating feature 474 to provide for robot arm mechanism 10 access to the more distant locating feature 472.

Figure 16A:
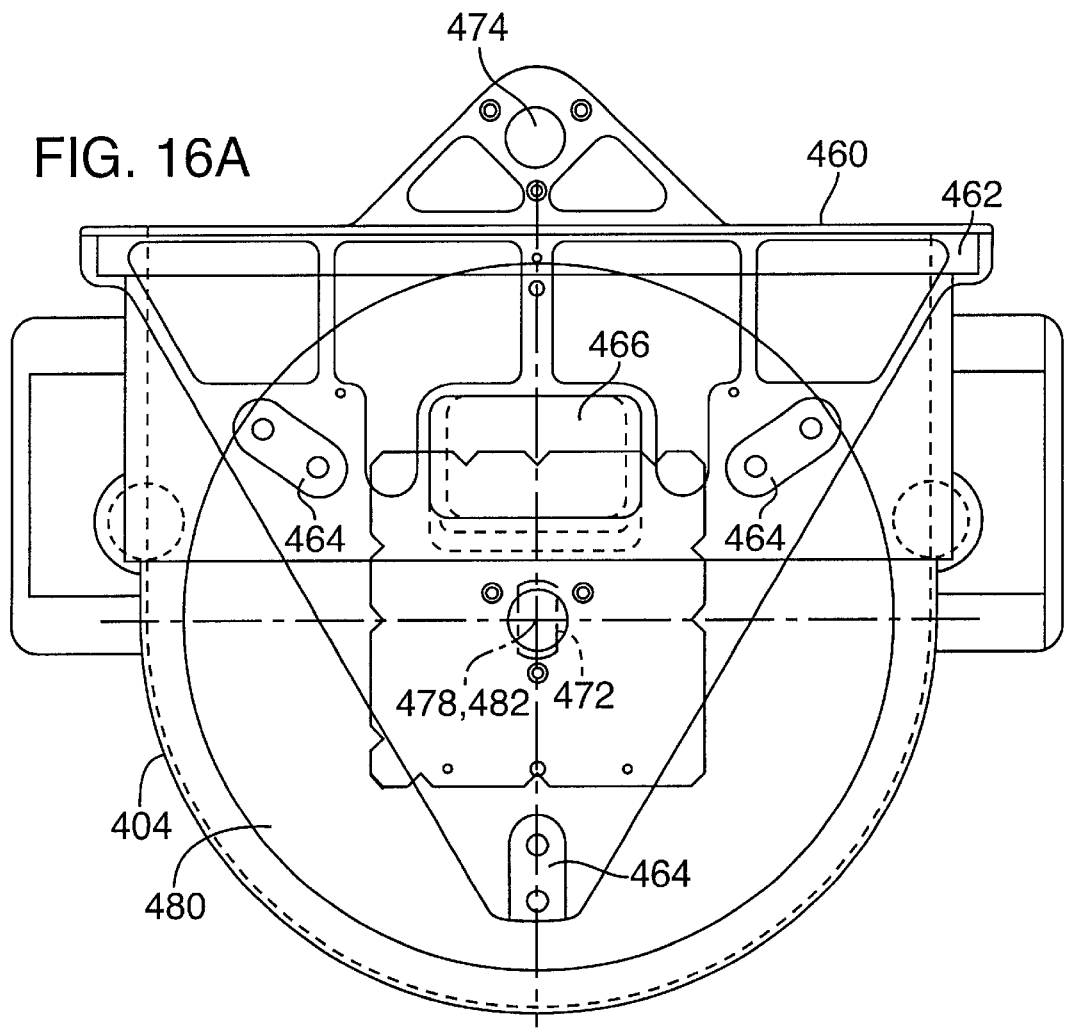
FIGS. 16A, 16B, and 16C are, respectively, a bottom plan view of the component emulating fixture superimposed on an outline of the wafer carrier, a side elevation view of the fixture similar to that of FIG. 15A, and a rear end view of the fixture inverted relative to that of FIG. 15B.
Figure 16B:
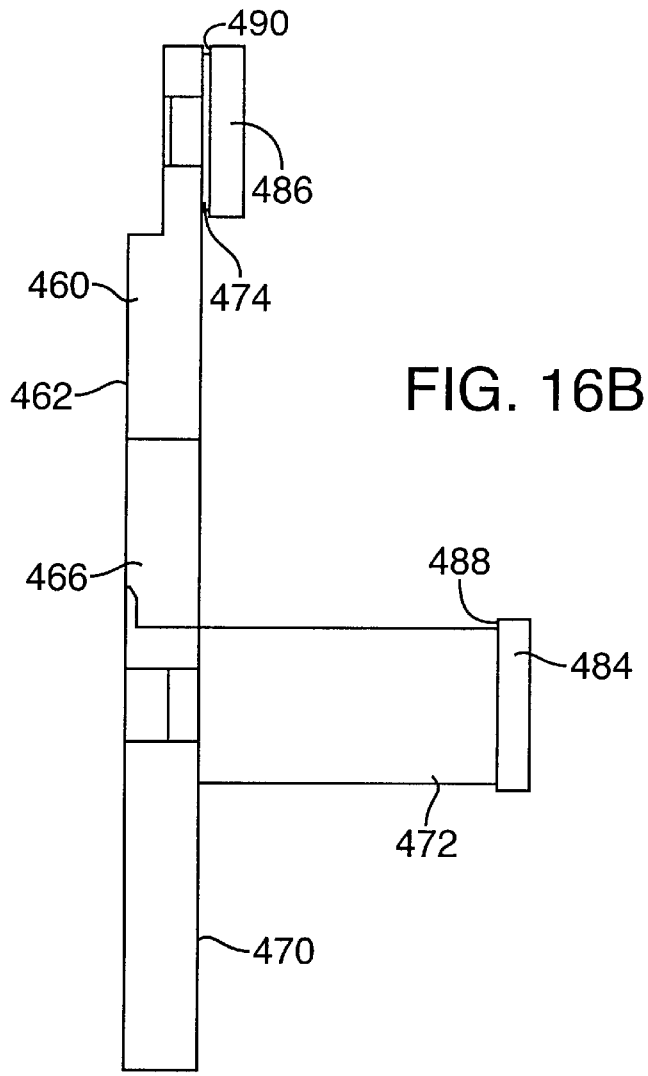
Figure 16C:
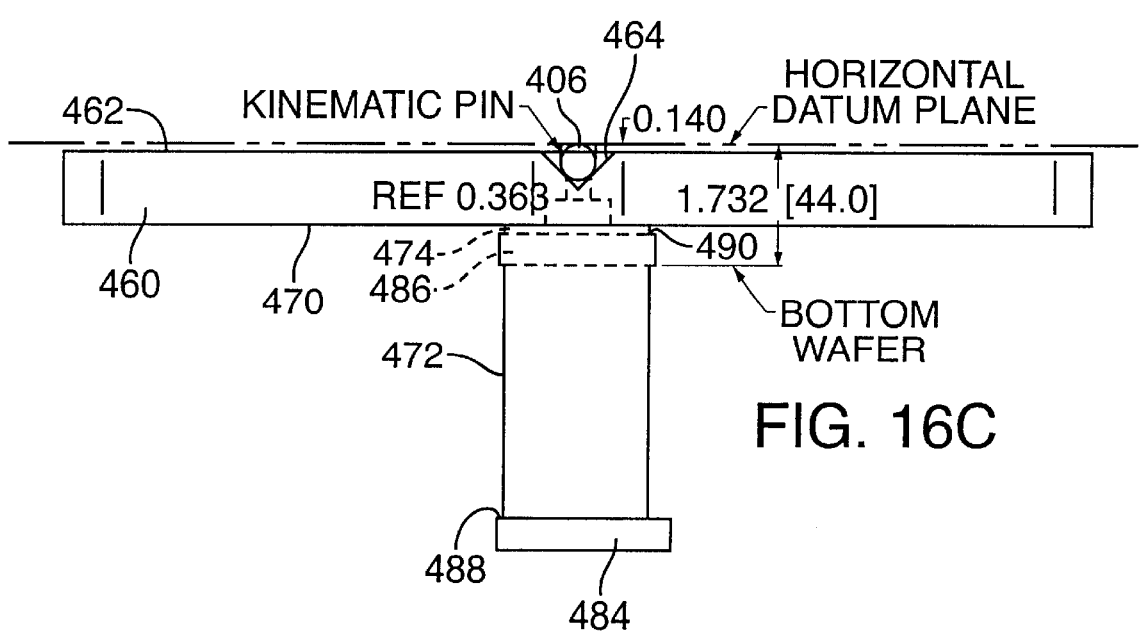

FIGS. 16A, 16B, and 16C are, respectively, a bottom plan view of fixture 460 superimposed on an outline of wafer carrier 404, a side elevation view of fixture 460 similar to that of FIG. 15A of fixture 460, and rear end view of fixture 460 inverted relative to that of FIG. 15B of fixture 460. FIG. 16A shows the coincidence of the placement of effective center 478 of a wafer 480 and longitudinal axis 476 of locating feature 472, as well as the coincidence of the two respective kinematic pin receiving features 444 of wafer carrier 404 and depressions 464 of fixture 460.

Figure 17:
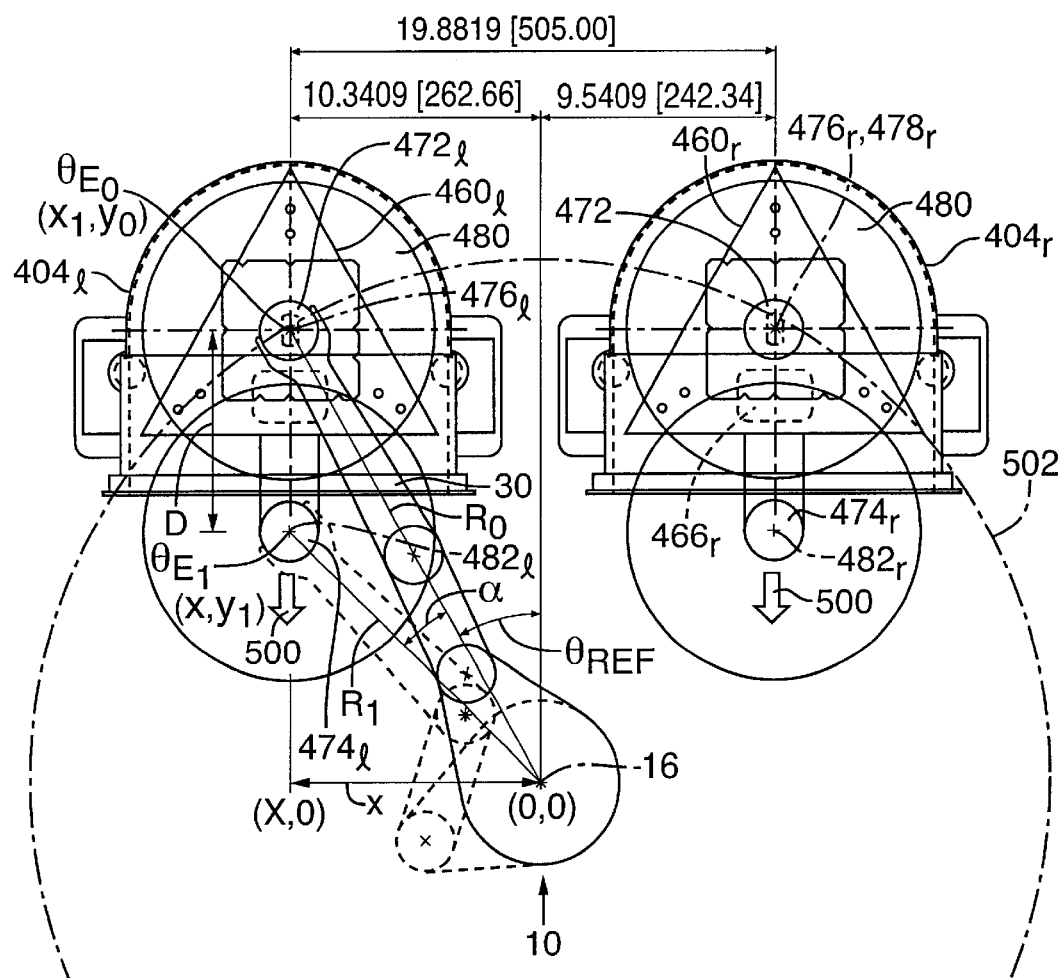
FIG. 17 shows two wafer carriers positioned side by side with their front openings in a nominal coplanar relation, similar to that depicted in FIG. 6A.
Figure 18:
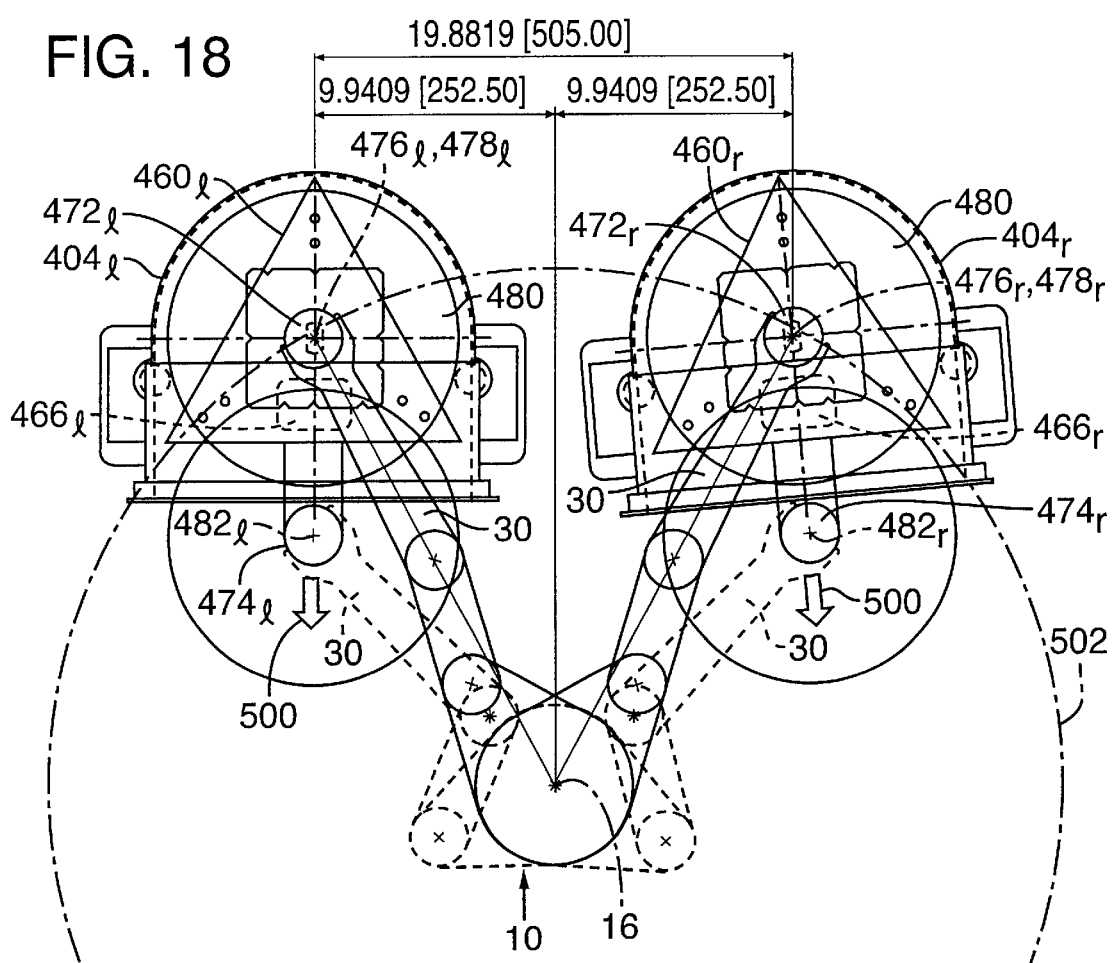
FIG. 18 shows two wafer carriers positioned side by side but with one of them offset such that their front openings are misaligned from the nominal coplanar position shown in FIG. 17.

FIG. 17 shows wafer carriers $404_l$ and $404_r$ positioned side by side with their front openings in coplanar relation, similar to that depicted in FIG. 6A. FIG. 18 shows wafer carriers $404_l$ and $404_r$ positioned side by side but with wafer carrier $404_l$ offset such that the front openings of wafer carriers $404_l$ and $404_r$ are misaligned from the nominal coplanar position shown in FIG. 17.

With reference to FIGS. 17 and 18, three link robot arm mechanism 10 is positioned to extend its end effector 30 to reach each of first and second locating features 472 and 474 of fixtures 460$_l$ and 460$_r$ to acquire for each of them two sets of extension position data for measuring the actual positions of wafer carriers 404$_l$ and 404$_r$ and thereby the relative alignment between them. Direction arrows 500 show the straight line move required to withdraw wafer 480 from either of wafer carriers 404$_l$ and 404$_r$. Wafer 480 is shown in two positions along the straight line trajectory with effective center 478 of wafer 480 coincident with respective longitudinal axes 476 and 482 of locating features 472 and 474. Skilled persons will appreciate that locating feature's 472 and 474 need not lie along a straight line path of robot arm movement but only reside in known locations. There is no restriction of the number of locating feature points, so long as their locations are known.

Robot arm mechanism 10 is positioned away from and between the positions of the front openings of wafer carriers 404$_l$ and 404$_r$, but not at a location equidistant between the effective centers 478 of the wafers 480 stored in them. A broken line circle 502 represents the perimeter of the distal end of end effector 30 when it is fully extended and angularly displaced 360 degrees about its shoulder axis 16. Circle 502 does not, therefore, intersect the effective centers 478 of wafers 480 stored in cassettes 414$_l$ and 414$_r$ of FIG. 17.

The position coordinates of the desired orientations of wafer carriers 404$_l$ and 404$_r$ derived from the two sets of robot arm position data acquired by causing robot arm end effector 30 to contact each of locating features 472 and 474. In a preferred manner of operation, a user manually places end effector 30 against each locating feature 472 and 474, and the available robot arm mechanism data are acquired as described with reference to FIGS. 6A and 6B. The actual position coordinates of locating features 472 and 474 are compared against the nominal position coordinates of wafer carrier 404$_l$ to compute any offset or deviation from a nominal alignment relative to shoulder axis 16 of robot arm mechanism 10. Equipping robot arm mechanism 10 with Z-axis displacement control and measurement along the length of shoulder axis 16 would provide an ability to place end effector 30 against lower surfaces 488 and 490 of the respective top caps 484 and 486 and measure the heights of locating fixtures 472 and 474. This would provide position coordinates for two points not at the same elevation in three-dimensional space, from which a skilled person can derive information for each of six degrees of freedom.

Figure 19:
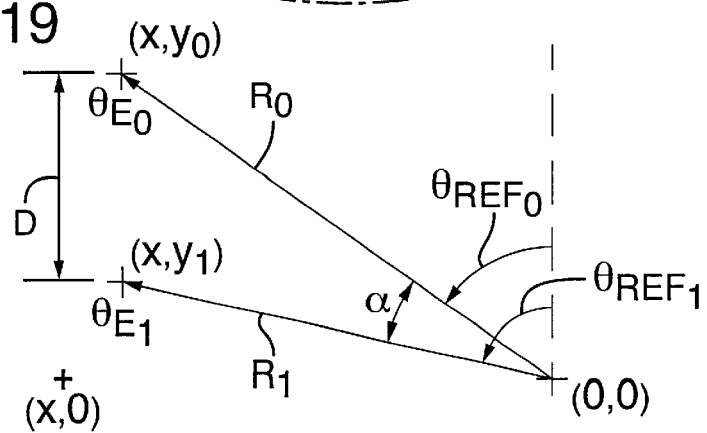
FIG. 19 is a diagram showing two radii representing distances between a robot arm mechanism shoulder axis and locating feature longitudinal axis for the extension of the end effector to two locating features of the component emulating fixture.

FIG. 19 is a diagram showing radii $R_0$ and $R_1$ representing distances between shoulder axis 16 and longitudinal axes 476 and 482 for, respectively, the extension of end effector 30 to locating features 472$_1$ and 474$_1$ for wafer carrier 404$_1$. The following mathematical expressions demonstrate the derivation from known robot arm mechanism parameters the required position coordinates for wafer carrier 404$_1$ to effect a straight line move for withdrawing wafer 480 as depicted in FIGS. 17 and 18. With reference to FIG. 19, the positions of locating features 472$_1$ and 474$_1$ are represented by position coordinates $(X, Y_0)$ and $(X, Y_1)$, respectively, and shoulder axis 16 as represented by position coordinates (0, 0). The robot arm extensions $R_0$ and $R_1$ are expressed as follows:

$$R_0^2 = X^2 + Y_0^2 = X^2 + (Y_1+D)^2 = X^2 + Y_1^2 + 2Y_1D + D^2 \tag{4}$$

$$R_1^2 = X^2 + Y_1^2, \text{ where} \tag{5}$$

D is the distance between longitudinal axes 476$_1$ and 482$_1$ (i.e., $(Y_0 - Y_1)$). Subtracting $R_1^2$ from $R_0^2$ gives $$R_0^2 - R_1^2 = 2Y_1 D + D^2. \tag{6}$$

Solving equation (6) for $Y_1$ and squaring the result gives $$Y_1^2 = \frac{1}{4D^2}(R_0^2 - R_1^2 - D^2)^2. \tag{7}$$

Solving equation (5) for $X^2$ gives $$X^2 = R_1^2 - Y_1^2, \tag{8}$$

and substituting the right-hand side of equation (7) for $Y_1^2$ gives $$X^2 = R_1^2 - \frac{1}{4D^2}(R_0^2 - R_1^2 - D^2). \tag{9}$$

Applying the law of cosines to solve for D as a function of α, which is the included angle between $R_0$ and $R_1$, gives $$D^2 = R_0^2 + R_1^2 - 2R_0 R_1 \cos \alpha \tag{10}$$

Equations (7) and (9) can be solved from the robot arm mechanism parameters $\theta_{REF0}$, the angle of motor 52 when end effector 30 contacts locating feature 472$_1$, and $\theta_{REF1}$, the angle of motor 52 when end effector 30 contacts locating feature 474$_1$. The angles $\theta_{REF0}$ and $\theta_{REF1}$ equal arcsin $X/R_0$ and arcsin $X/R_1$, respectively; and the angle $\alpha = \theta_{REF0} - \theta_{REF1}$.

The foregoing expressions dictate what the position coordinates should be for a properly aligned system. The motor angles available from glass scale encoders can give the appropriate information for controller 54 to offset the necessary parameters to give the motion of robot arm mechanism or provide a read out to the operator indicative of how to reposition wafer carrier 404$_l$ to get the desired position coordinates. The "automatic training" of the robot arm mechanism path option is greatly preferred because it affords a software adjustment solution as an alternative to a difficult, time-consuming mechanical alignment solution. The mechanical alignment solution is necessary for robot arm mechanisms that are incapable of moving wafers or other specimens along nonradial paths.

Skilled persons will appreciate that the equations of motion set forth above pertain to a three link robot arm mechanism with a one-to-one link ratio. The present invention can, therefore, be implemented with robot arm mechanisms having different numbers of links and/or different link ratios. For example, the invention can be implemented with a telescopic robot arm mechanism.

It will be obvious to those having skill in the art that many changes may be made to the details of the above-described embodiments of this invention without departing from the underlying principles thereof. As a first example, the invention can be used with a different specimen holder such as a wafer prealigner, on top of which a wafer is placed. As a second example, proper registration of the component emulating fixture need not be achieved by mounting features matable to support structure mounting elements but could be accomplished by other techniques, such as optical (e.g., a video camera) or quadrature signal alignment detection techniques. The scope of the present invention should, therefore, be determined only by the following claims.

What is claimed is:

1. In a specimen processing system that includes a robot arm mechanism in nominal alignment relative to a specimen holder positioned on a support surface of a support structure and having a clear area through which an end effector reaches to remove a specimen from or place a specimen in or on the specimen holder, the support surface of the support structure having mounting elements and the specimen holder having alignment surface features that are matable to the mounting elements, a method of determining an actual alignment of the robot arm mechanism relative to the specimen holder that differs from the nominal alignment to ensure that the end effector can remove specimens from and place specimens in the holder, comprising:

placing a component emulating fixture on the support surface of the support structure, the fixture being matable to the mounting elements to assure the actual alignment position of the specimen holder and including first and second locating features positioned to engage the end effector into extension position;

positioning the robot arm mechanism to contact the first locating feature to acquire a first set of robot arm position data;

positioning the robot aim mechanism to contact the second locating feature to acquire a second set of robot arm mechanism position data; and using the first and second sets of robot arm mechanism position data in conjunction with robot arm mechanism equation of motion to determine whether alignment positioning of the specimen holder relative to the robot arm mechanism represents an offset in the actual alignment in relation to the nominal alignment.

2. The method of claim 1, further comprising providing the first and second position coordinate information in a form usable for manual relative repositioning of the specimen holder and the robot arm mechanism to correct for the alignment offset.

3. The method of claim 1, further comprising reprogramming the robot arm mechanism to control its trajectory to eliminate position error caused by the alignment offset.

4. The method of claim 1 in which the first and second locating features extend upwardly of the fixture and are of different heights so as to allow the robot arm mechanism to access and engage both of them.

5. The method of claim 1 in which the first and second locating features are offset along different radial paths so as to allow a robot arm mechanism to access and engage both of them.

6. The method of claim 1 in which one of the first and second locating features is located at the true center of a wafer stored in the specimen holder when positioned correctly on the support structure.

7. The method of claim 1 in which the locating features are of cylindrical shape and the end effector has a distal fork-shaped end that engages each of the locating features in a manner that self centers on the locating feature.

8. In a specimen processing system that includes a robot arm mechanism in nominal alignment relative to a specimen holder positioned on a support surface of a support structure and having a clear area through which an end effector reaches to remove a specimen from or place a specimen in or on the specimen holder, a method of determining an actual alignment of the robot arm mechanism relative to the specimen bolder that differs from the nominal alignment to ensure that the end effector can remove specimens from and place specimens in the holder, comprising:

placing a component emulating fixture on the support surface of the support structure, the fixture being adapted to assume the actual alignment position of the specimen holder and including first and second locating features positioned to engage the end effector into extension position;

positioning the robot arm mechanism to contact the first locating feature to acquire a first set of robot arm position data;

positioning the robot arm mechanism to contact the second locating feature to acquire a second set of robot arm mechanism position data; and using the first and second sets of robot arm mechanism position data in conjunction with robot arm mechanism equations of motion to determine whether alignment positioning of the specimen holder relative to the robot arm mechanism represents an offset in the actual alignment in relation to the nominal alignment.

9. The method of claim 8, further comprising providing the first and second position coordinate information in a form usable for manual relative repositioning of the specimen holder and the robot arm mechanism to correct for the alignment offset.

10. The method of claim 8, further comprising reprogramming the robot arm mechanism to control its trajectory to eliminate position error caused by the alignment offset.

11. The method of claim 8 in which the first and second locating features extend upwardly of the fixture and are of different heights so as to allow the robot arm mechanism to access and engage both of them.

12. The method of claim 8 in which the fixture is adapted to assume the actual position of the specimen holder by an indirect alignment technique.

13. The method of claim 12 in which the indirect alignment technique entails the use of a video camera.

* * * * *